US012538314B2

(12) United States Patent
Matsumura et al.

(10) Patent No.: US 12,538,314 B2
(45) Date of Patent: Jan. 27, 2026

(54) TERMINAL, RADIO COMMUNICATION METHOD, AND BASE STATION

(71) Applicant: NTT DOCOMO, INC., Tokyo (JP)

(72) Inventors: Yuki Matsumura, Tokyo (JP); Shohei Yoshioka, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 326 days.

(21) Appl. No.: 18/257,715

(22) PCT Filed: Dec. 18, 2020

(86) PCT No.: PCT/JP2020/047501
§ 371 (c)(1),
(2) Date: Jun. 15, 2023

(87) PCT Pub. No.: WO2022/130629
PCT Pub. Date: Jun. 23, 2022

(65) Prior Publication Data
US 2024/0057088 A1    Feb. 15, 2024

(51) Int. Cl.
*H04W 72/21* (2023.01)
*H04L 1/1812* (2023.01)
*H04W 72/1273* (2023.01)

(52) U.S. Cl.
CPC .......... *H04W 72/21* (2023.01); *H04L 1/1812* (2013.01); *H04W 72/1273* (2013.01)

(58) Field of Classification Search
None
See application file for complete search history.

(56) References Cited

U.S. PATENT DOCUMENTS

| 2018/0076935 | A1  | 3/2018 | Seo et al. |           |
|--------------|-----|--------|------------|-----------|
| 2019/0132104 | A1* | 5/2019 | Lee        | H04W 4/40 |
| 2019/0274131 | A1  | 9/2019 | Yamazaki et al. |      |
| 2022/0124767 | A1* | 4/2022 | Fu         | H04L 5/0055 |
| 2023/0047407 | A1* | 2/2023 | Li         | H04B 7/0639 |
| 2023/0262684 | A1* | 8/2023 | Jiang      | H04L 5/0048 |
|              |     |        |            | 370/330   |

(Continued)

FOREIGN PATENT DOCUMENTS

| WO | 2010/027167 A2 | 3/2010 |
| WO | 2018/021298 A1 | 2/2018 |

OTHER PUBLICATIONS

Office Action issued in Japanese Patent Application No. 2022-569670, dated Oct. 15, 2024 (8 pages).

(Continued)

*Primary Examiner* — Hong S Cho
(74) *Attorney, Agent, or Firm* — Osha Bergman Watanabe & Burton LLP

(57) ABSTRACT

A terminal according to one aspect of the present disclosure includes: a receiving section that receives a configuration of a physical uplink control channel (PUCCH) resource for transmission of hybrid automatic repeat reQuest acknowledgement (HARQ-ACK) information for a multicast physical downlink shared channel (PDSCH); and a control section that controls transmission of the HARQ-ACK information using the PUCCH resource. According to one aspect of the present disclosure, it is possible to appropriately receive multicast downlink data.

5 Claims, 19 Drawing Sheets

(56) References Cited

U.S. PATENT DOCUMENTS

2023/0422275 A1* 12/2023 Kim ..................... H04L 5/0055

OTHER PUBLICATIONS

Office Action issued in counterpart Japanese Patent Application No. 2022-569670 mailed on Jan. 21, 2025 (6 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
International Search Report issued in PCT/JP2020/047501 on Jun. 22, 2021 (5 pages).
Written Opinion of the International Searching Authority issued in PCT/JP2020/047501 on Jun. 22, 2021 (4 pages).
Office Action issued in Japanese Patent Application No. 2022-569670, issued Apr. 15, 2025 (6 pages).

* cited by examiner

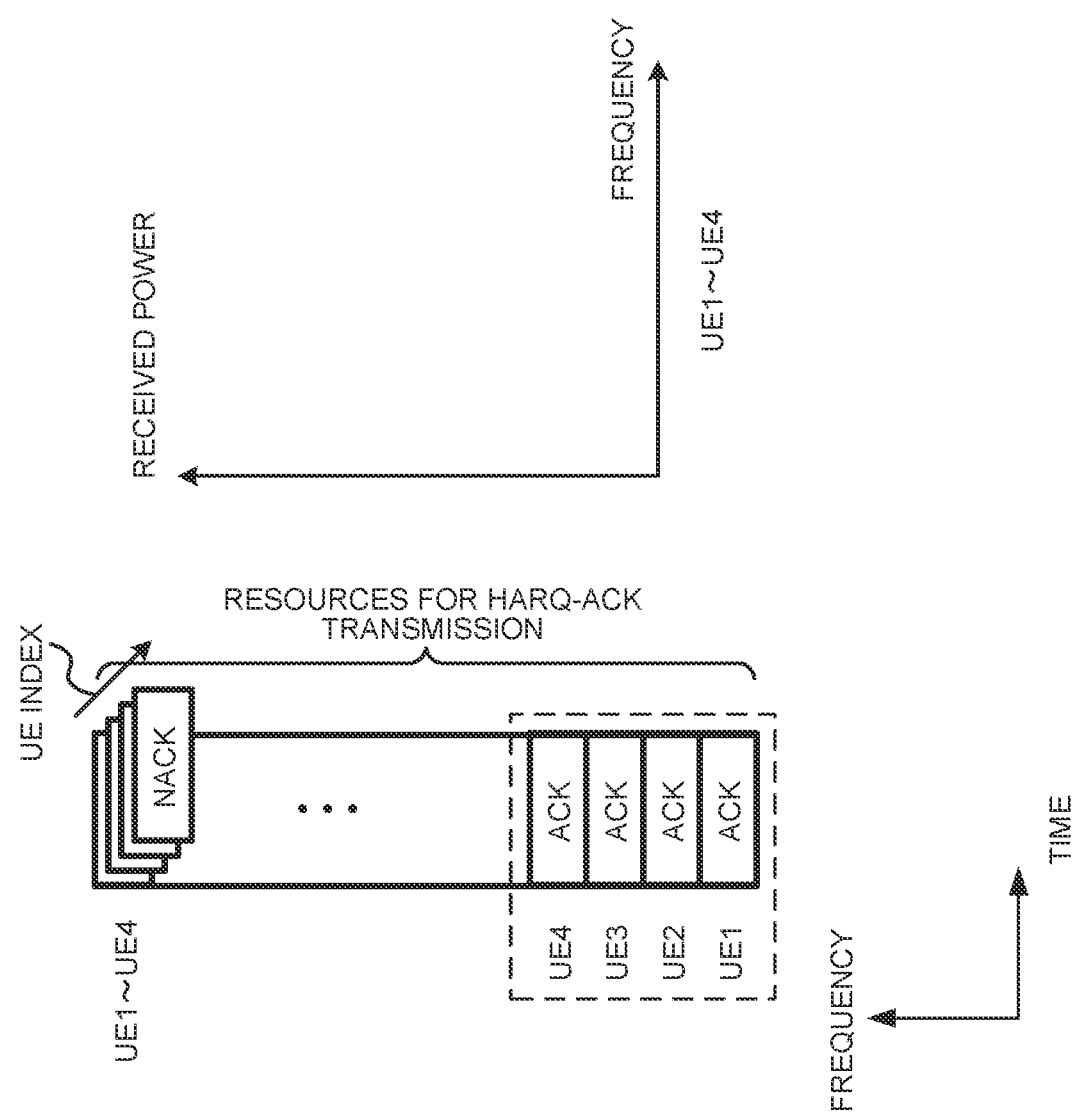
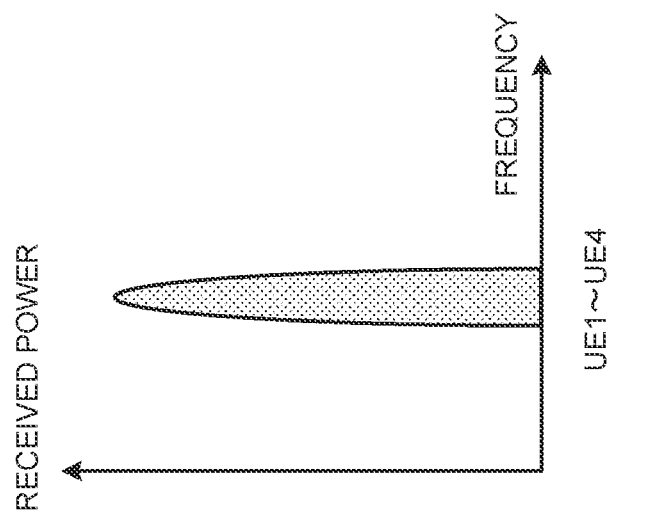

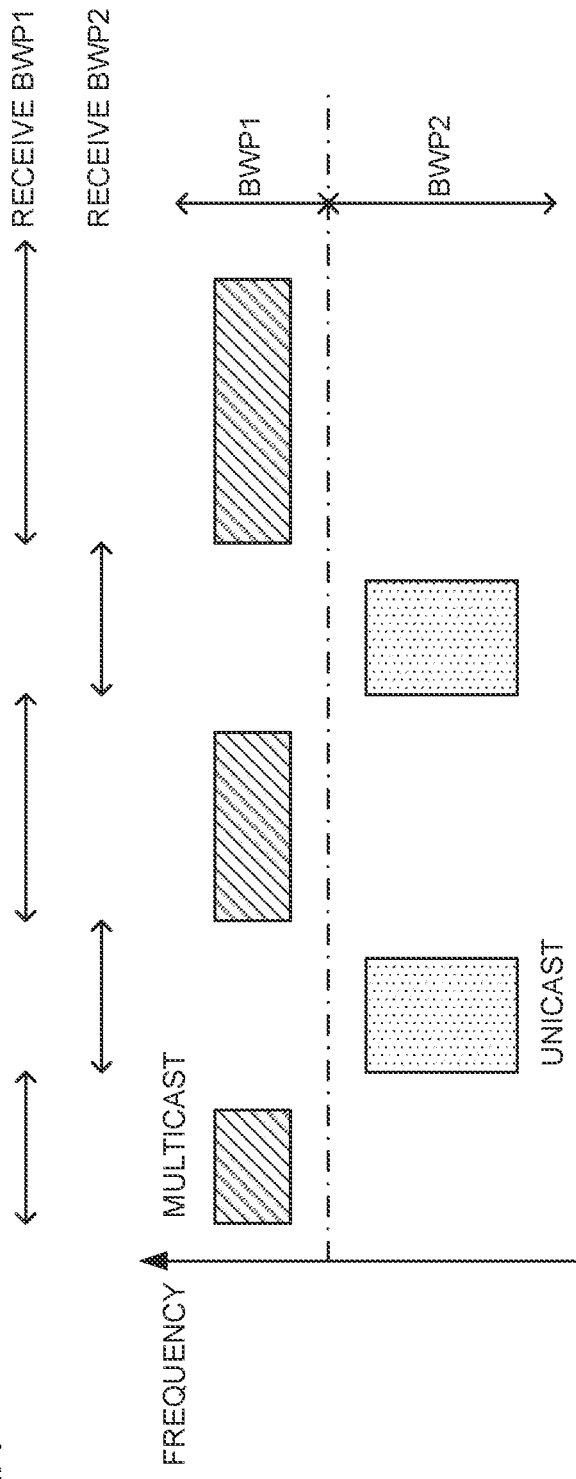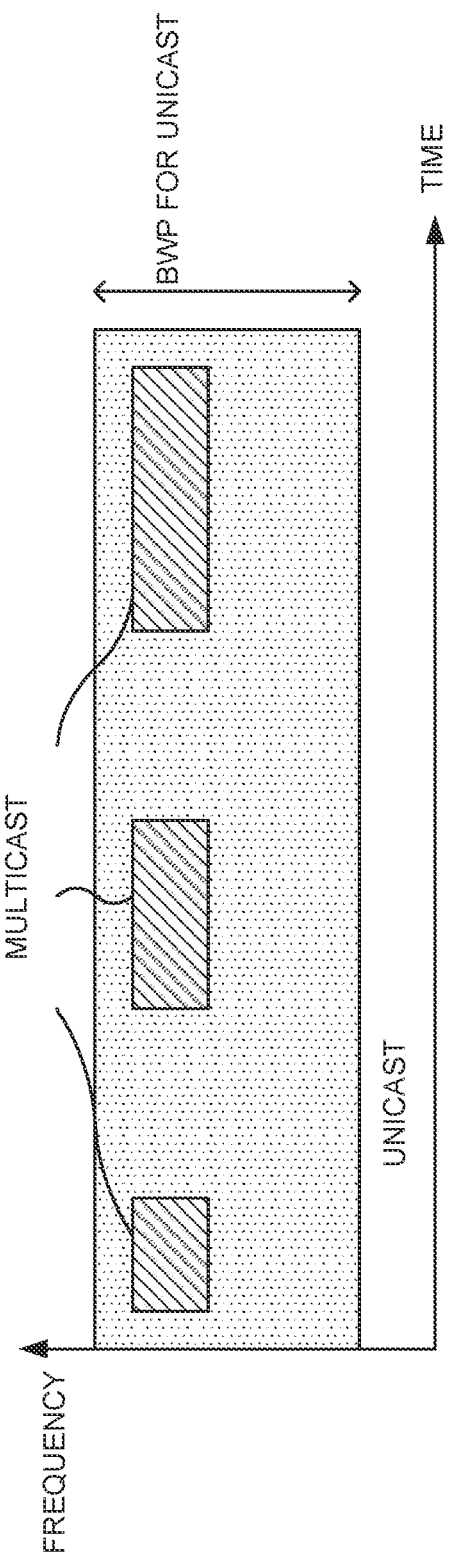
FIG. 4A
FIG. 4B

FIG. 9A

DCI | PRI0 (FOR UE0) | PRI1 (FOR UE1) | PRI2 (FOR UE2) | PRI3 (FOR UE3) →  DCI FIELD POSITION

FIG. 9B

PUCCH resource set#0

| PRI | PUCCH resource#0 | ... | PUCCH resource#3 |
|-----|------------------|-----|------------------|
| 000 | PUCCH resource#0-0 | ... | PUCCH resource#3-0 |
| 001 | PUCCH resource#0-1 | ... | PUCCH resource#3-1 |
| ... | ... | ... | ... |
| 111 | PUCCH resource#0-7 | ... | PUCCH resource#3-7 |

PUCCH resource set#1

| PRI | PUCCH resource#0 | ... | PUCCH resource#3 |
|-----|------------------|-----|------------------|
| 000 | PUCCH resource#0-0 | ... | PUCCH resource#3-0 |
| 001 | PUCCH resource#0-1 | ... | PUCCH resource#3-1 |
| ... | ... | ... | ... |
| 111 | PUCCH resource#0-7 | ... | PUCCH resource#3-7 |

→ NUMBER OF UCI BITS

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (for example, also referred to as "5th generation mobile communication system (5G)," "5G+ (plus)," "6th generation mobile communication system (6G)," "New Radio (NR)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

It is assumed, in future radio communication systems (for example, NR), that a plurality of user terminals (User Equipments (UEs)) perform communication in an ultra-dense and high traffic environment.

It is assumed, in NR, that a plurality of UEs performs reception of downlink data using multicast in such an environment.

However, sufficient study has not been performed for UE reception of multicast downlink data, for previous NR specifications. Unless reception of downlink data using multicast is appropriately performed, system performance may degrade such as throughput reduction.

Thus, an object of the present disclosure is to provide a terminal, a radio communication method, and a base station that enable appropriate reception of multicast downlink data.

Solution to Problem

A terminal according to one aspect of the present disclosure includes: a receiving section that receives a configuration of a physical uplink control channel (PUCCH) resource for transmission of hybrid automatic repeat reQuest acknowledgement (HARQ-ACK) information for a multicast physical downlink shared channel (PDSCH); and a control section that controls transmission of the HARQ-ACK information using the PUCCH resource.

Advantageous Effects of Invention

According to one aspect of the present disclosure, it is possible to appropriately receive multicast downlink data.

BRIEF DESCRIPTION OF DRAWINGS

FIGS. 3A to 3C are diagrams to show an example of NACK-only feedback.

FIGS. 4A and 4B are diagrams to show examples of frequency resources used for multicast PDSCHs.

FIGS. 9A and 9B are diagrams to show an example of a PUCCH resource configuration according to Aspect 2-1.

DESCRIPTION OF EMBODIMENTS (PUCCH Formats)

Figure 1:
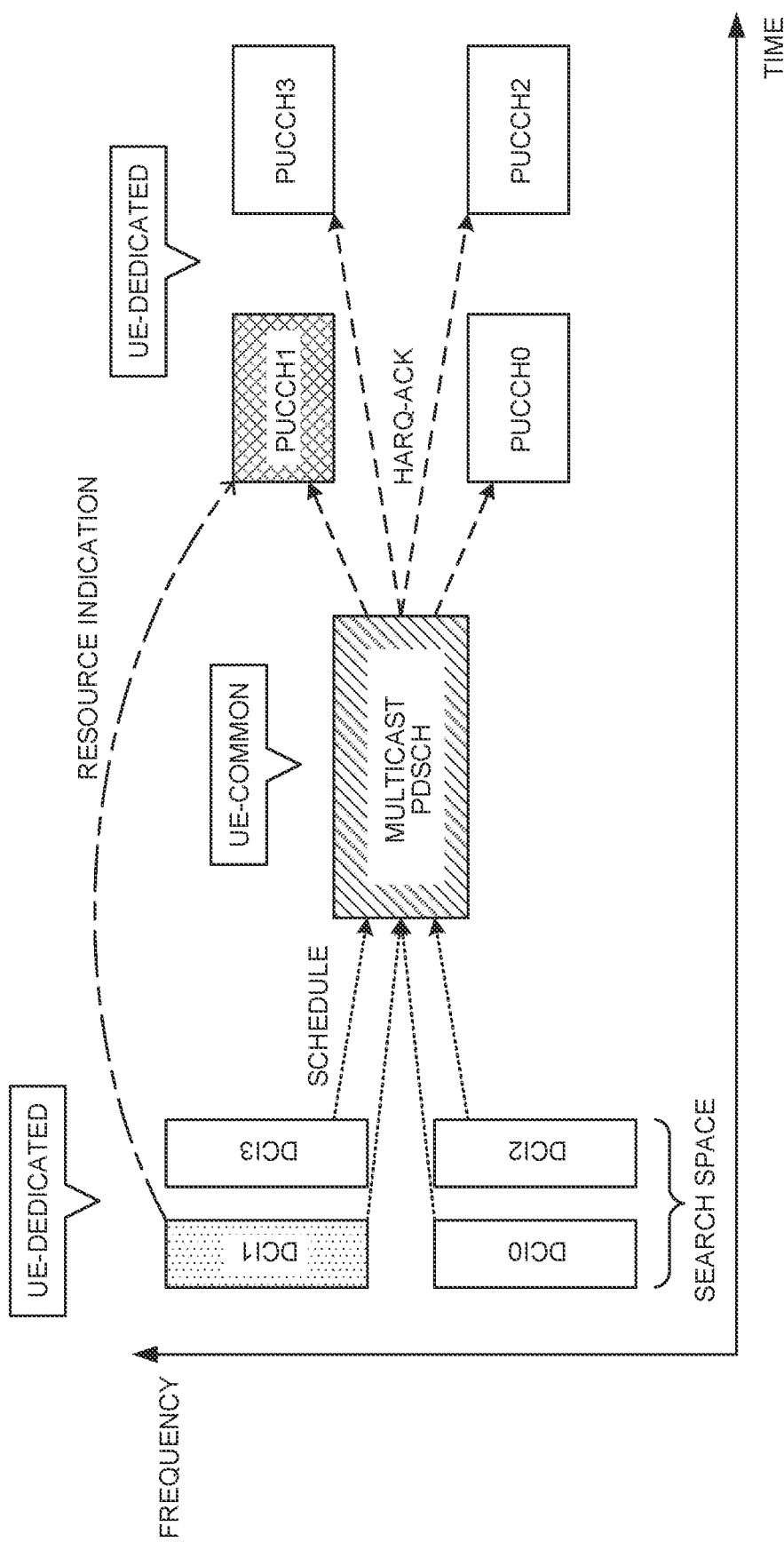
FIG. 1 is a diagram to show an example of a procedure for receiving a multicast PDSCH.

For future radio communication systems (for example, Rel. 15 (or later versions), 5G, NR, and the like), configurations (also referred to as formats, PUCCH formats (PFs), and the like) for an uplink control channel (for example, a PUCCH) used for transmission of uplink control information (UCI) are studied. For example, for Rel-15 NR, it is studied to support five kinds of PFs, i.e., PF0 to PF4. Note that the terms of PFs given below are merely examples and different terms may be used.

For example, PF0 and PF1 are PFs used for transmissions of UCI of up to two bits (up to 2 bits). For example, UCI may be at least one of transmission confirmation information (also referred to as Hybrid Automatic Repeat reQuest-Acknowledgement (HARQ-ACK), acknowledgement (ACK), negative-acknowledgement (NACK), or the like) and scheduling request (SR). PF0 allows allocation to one or two symbols and is hence also referred to as a short PUCCH, a sequence-based short PUCCH, or the like. In contrast, PF1 allows allocation to four to 14 symbols and is hence also referred to as a long PUCCH or the like. PF0 may use cyclic shift based on at least one of an initial cyclic shift (CS) index, a UCI value, a slot number, and a symbol number to transmit a sequence obtained by the cyclic shift of a base sequence. In PF1, a plurality of user terminals may be code division multiplexed (CDMed) in the same physical resource block (PRB) by block-wise spreading of the time domain using at least one of CS and time domain (TD)-orthogonal cover code (OCC).

PF2 to PF4 are PFs used for transmission of UCI of more than two bits (more than 2 bits) (for example, channel state information (CSI) or at least one of CSI, an HARQ-ACK, and an SR). PF2 allows allocation to one or two symbols and is hence also referred to as a short PUCCH or the like. In contrast, PF3 and PF4 allow allocation to four to 14 symbols and are hence also referred to as long PUCCHs or the like. In PF4, a plurality of user terminals may be CDMed by using block-wise spreading before DFT (of frequency domain (FD)-OCC).

For PF1, PF3, and PF4, intra-slot frequency hopping may be applied. Assume that the length of a PUCCH is $N_{symb}$. In this case, the length before frequency hopping (first hop) may be floor($N_{symb}$/2) and the length after frequency hopping (second hop) may be ceil ($N_{symb}$/2).

PF0, PF1, and PF2 may have Cyclic Prefix (CP)-Orthogonal Frequency Division Multiplexing (OFDM) waveforms. PF3 and PF4 may have Discrete Fourier Transform (DFT)-spread(s)-OFDM waveforms.

Allocation of a resource (for example, a PUCCH resource) to be used for transmission of the uplink control channel is performed by using higher layer signaling and/or downlink control information (DCI). Here, the higher layer signaling only needs to be at least one of RRC (Radio Resource Control) signaling, system information (for example, at least one of RMSI: Remaining Minimum System Information, OSI: Other System Information, MIB: Master Information Block, and SIB: System Information Block) and broadcast information (PBCH: Physical Broadcast Channel), for example.

In NR, the number of symbols allocated to a PUCCH (which may also be referred to as PUCCH allocated symbols, PUCCH symbols, and the like) may be determined in any or a combination of slot-specific, cell-specific, and user-terminal-specific manners. Since an increase of communication distance (coverage) is expected with a larger number of PUCCH symbols, it is assumed to employ such operation that a larger number of symbols are allocated to a user terminal further from a base station (for example, an eNB or gNB), for example.

(NR Multicast/Broadcast)

In Rel-16 (or previous version) NR, transmission of at least one of a signal and a channel (referred to as a signal/channel below) from an NW to a UE is basically unicast transmission. In this case, it is assumed that each of a plurality of UEs receives an identical downlink (DL) data signal/channel (for example, a downlink shared channel (PDSCH)) transmitted from the NW to the UEs, by using a plurality of reception occasions corresponding to a plurality of beams (or panels) of the NW.

Assumed is a case where a plurality of UEs receive identical signals/channels simultaneously in an ultra-dense and high traffic state such as an environment densely populated with a number of UEs geographically (for example, a stadium or the like). It is considered that, in such a case, each of the plurality of UEs located in the same area and receiving, in order to receive the identical signal/channel by the UE, the signal/channel by using unicast by the UE can ensure reliability of communication but reduces resource usage efficiency.

A mechanism of group scheduling for reception of multicast/broadcast service (MBS) by a plurality of UEs is under study.

For example, it is studied to schedule a multicast PDSCH by one or more pieces of DCI. In this case, the size of DCI (payload size, overhead) may increase.

In Point-to-Point (PTP) transmission (delivery method), a RAN node (for example, a base station) wirelessly transmits separate copies of an MBS data packet to respective UEs. In Point-to-Multipoint (PTM) transmission (delivery method), a RAN node (for example, a base station) wirelessly transmits a single copy of an MBS data packet to a set of UEs.

It is studied that the PTP transmission uses a UE-specific PDCCH for scheduling a UE-specific PDSCH for each of a plurality of RRC connected UEs (RRC_CONNECTED UEs), that the UE-specific PDCCH is with cyclic redundancy check (CRC) scrambled by a UE-specific radio network temporary identifier (RNTI) (for example, a C-RNTI), and that the UE-specific PDSCH is scrambled by using the same UE-specific RNTI.

It is studied that PTM transmission scheme 1 uses a group-common PDCCH to schedule a group-common PDSCH for a plurality of RRC connected UEs in the same MBS group, the group common PDCCH is with CRC scrambled by a group-common RNTI, and that the group-common PDSCH is scrambled by using the same group-common RNTI.

It is studied that PTM transmission scheme 2 uses a UE-specific PDCCH for scheduling a group-common PDSCH for each of a plurality of RRC connected UEs in the same MBS group, that the UE-specific PDCCH is with CRC scrambled by a UE-specific RNTI (for example, a C-RNTI), and that the group-common PDSCH is scrambled by using a group-common RNTI.

Here, the UE-specific PDCCH/PDSCH can be identified by a target UE but cannot be identified by the other UEs in the same MBS group. The group-common PDCCH/PDSCH is transmitted in the same time/frequency resource and can be identified by all the UEs in the same MBS group.

HARQ feedback for improvement of reliability of MBS is also studied.

At least PTM transmission scheme 1 may support at least one of feedback methods 1 and 2 below for RRC connected UEs to receive multicast.

{Feedback Method 1} HARQ-ACK feedback based on ACK/NACK for multicast (ACK/NACK based HARQ-ACK feedback, ACK/NACK based PUCCH, ACK/NACK transmission, ACK/NACK feedback)

A UE that has successfully decoded a PDSCH transmits an ACK. A UE that has failed to decode a PDSCH transmits a NACK.

{Feedback Method 2} HARQ-ACK feedback based only on NACK for multicast (NACK-only based HARQ-ACK feedback, NACK-only based PUCCH, NACK-only transmission, NACK-only feedback)

A UE that has successfully decoded a PDSCH does not transmit an ACK. A UE that has failed to decode a PDSCH transmits a NACK.

Figure 2:
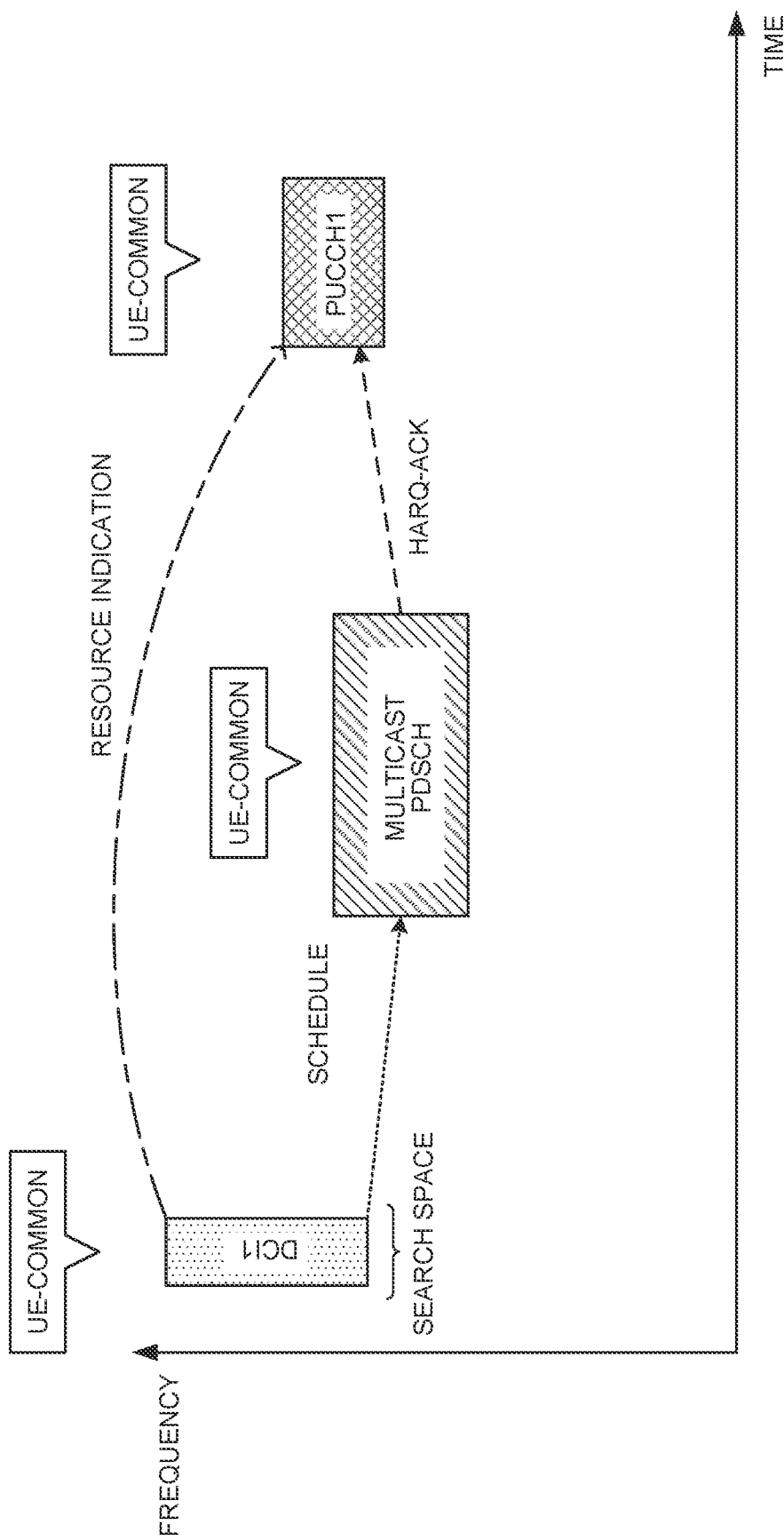
FIG. 2 is a diagram to show another example of the procedure for receiving a multicast PDSCH

As in the example in FIG. 1, each piece of UE-specific (dedicated) DCI may schedule a UE-common PDSCH (multicast PDSCH) and a UE-specific (dedicated) PUCCH including an HARQ-ACK for the UE-common PDSCH. As in the example in FIG. 2, UE-common DCI may schedule a UE-common PDSCH (multicast PDSCH) and a UE-common PUCCH including an HARQ-ACK for the UE-common PDSCH.

Among a plurality of UEs, HARQ-ACK resources for the multicast PDSCH may overlap. As in the example in FIG. 3A, among a plurality of UEs, resources for NACK may overlap without resources for ACK overlapping. As in the example in FIG. 3B, when a base station does not receive any signal (received power is equal to or lower than a threshold) in the resources for the NACK, the UE may judge that there is no UE that has transmitted a NACK, consequently not to retransmit the PDSCH. As in the example in FIG. 3C, when the base station receives a signal(s) (received power exceeds the threshold) in the resources for the NACK, the UE may judge that there is a UE(s) that has (have) transmitted a NACK, consequently to retransmit the PDSCH (s).

Common frequency resources for group-common PDCCH/PDSCH are restricted to within the frequency resources of a dedicated unicast BWP for multicast for the RRC connected UEs, in order to support simultaneous reception of unicast and multicast within the same slot. For the common frequency resources for group-common PDCCH/PDSCH, one of the following two options may be selected.

{Option 2A}

Common frequency resources are defined as an MBS-specific BWP. The MBS-specific BWP is associated with a dedicated unicast BWP and uses the same numerology (subcarrier spacing (SCS) and cyclic prefix (CP)) as that of the dedicated unicast BWP.

As in the example in FIG. 4A, a BWP for multicast (BWP1) and a BWP for unicast (BWP2) may be configured. BWP1 and BWP2 need not necessarily overlap in the frequency domain. When a UE does not receive BWP1 and BWP2 simultaneously, the UE may switch the BWP used for reception (active DL BWP, BWP1 or BWP2) in the time domain.

{Option 2B}

A common frequency resource is defined as an MBS frequency region with some consecutive PRBs. The MBS frequency region is configured within a dedicated unicast BWP.

As in the example in FIG. 4B, multicast PDSCH resources may be included in the unicast BWP.

For HARQ-ACK feedback based on an ACK/NACK when group-common PDCCH scheduling is supported for the RRC connected UEs to receive multicast, a PUCCH resource configuration for HARQ-ACK feedback from a viewpoint of each UE may be one selected from the following three options.

{Option 1}

The PUCCH resource configuration is common to a PUCCH resource configuration for HARQ-ACK feedback for unicast.

{Option 2}

The PUCCH resource configuration is separated from the PUCCH resource configuration for HARQ-ACK feedback for unicast.

{Option 3}

The PUCCH resource configuration is option 1 or 2 based on a configuration.

However, how to determine resources for HARQ-ACK feedback for multicast is not clear. Unless these resources are made clear, throughput reduction and the like may occur.

Thus, the inventors of the present invention came up with the idea of a method of determining resources for HARQ-ACK feedback for multicast.

Assume a case where PTM transmission scheme 1 is used and a UE receives DCI for scheduling a PDSCH. In this case, when the DCI is group-common DCI with CRC scrambled by a group-common RNTI, the UE can judge that the PDSCH is a multicast PDSCH. When the DCI is not the group-common DCI with CRC scrambled with the group-common RNTI, the UE can judge that the PDSCH is a unicast PDSCH.

When PTM transmission scheme 2 is used, UE-specific DCI with CRC scrambled with a UE-specific RNTI (for example, C-RNTI) schedules a multicast PDSCH.

However, a method of monitoring/receiving DCI for scheduling a multicast PDSCH and DCI for scheduling a unicast PDSCH is not clear. Unless the monitoring/reception method is clear, throughput reduction, an increase of power consumption, and the like may occur.

Thus, the inventors of the present invention came up with the idea of a method of monitoring/receiving DCI for scheduling a multicast PDSCH/a unicast PDSCH.

Embodiments according to the present disclosure will be described in detail with reference to the drawings as follows. The radio communication methods according to respective embodiments may each be employed individually, or may be employed in combination.

In the present disclosure, "A/B/C" and "at least one of A, B, and C" may be interchangeably interpreted. In the present disclosure, a cell, a serving cell, a CC, a carrier, a BWP, a DL BWP, a UL BWP, an active DL BWP, an active UL BWP, and a band may be interchangeably interpreted. In the present disclosure, an index, an ID, an indicator, and a resource ID may be interchangeably interpreted. In the present disclosure, "support," "control," "controllable," "operate," and "operable" may be interchangeably interpreted.

In the present disclosure, configuration (configure), activation (activate), update, indication (indicate), enabling (enable), specification (specify), and selection (select) may be interchangeably interpreted.

In the present disclosure, link, associate, correspond, and map may be interchangeably interpreted. In the present disclosure, allocate, assign, monitor, and map may be interchangeably interpreted.

In the present disclosure, the higher layer signaling may be, for example, any one or combinations of Radio Resource Control (RRC) signaling, Medium Access Control (MAC) signaling, broadcast information, and the like. In the present disclosure, RRC, RRC signaling, an RRC parameter, a higher layer, a higher layer parameter, an RRC information element (IE), and an RRC message may be interchangeably interpreted.

The MAC signaling may use, for example, a MAC control element (MAC CE), a MAC Protocol Data Unit (PDU), or the like. The broadcast information may be, for example, a master information block (MIB), a system information block (SIB), minimum system information (Remaining Minimum System Information (RMSI)), other system information (OSI), or the like.

In the present disclosure, a MAC CE and an activation/deactivation command may be interchangeably interpreted.

In the present disclosure, a UL channel, a PUCCH, a PUSCH, repetition, and a transmission occasion may be interchangeably interpreted.

In the present disclosure, multicast, groupcast, broadcast, and MBS may be interchangeably interpreted. In the present disclosure, a multicast PDSCH and a PDSCH scrambled by a group-common RNTI may be interchangeably interpreted.

In the present disclosure, an HARQ-ACK, HARQ-ACK information, HARQ, an ACK/NACK, an ACK, and a NACK may be interchangeably interpreted.

In the present disclosure, specific, dedicated, UE-specific, and UE-dedicated may be interchangeably interpreted.

In the present disclosure, common, shared, group-common, UE-common, and UE-shared may be interchangeably interpreted.

In the present disclosure, UE-specific DCI and DCI with CRC scrambled by a UE-specific RNTI may be interchangeably interpreted. The UE-specific RNTI may be a C-RNTI, for example.

In the present disclosure, UE-common DCI and DCI with CRC scrambled by a UE-common RNTI may be interchangeably interpreted. The UE-common RNTI may be a multicast-RNTI, for example.

(Radio Communication Method)

A UE may control/determine a PUCCH resource for transmitting UCI including an HARQ-ACK for a multicast PDSCH.

A PUCCH resource for transmission of UCI including an HARQ-ACK for a multicast PDSCH may be configured by higher layer signaling for each common frequency resource, or may be configured within the PUCCH configuration (PUCCH-Config) of a UL BWP as in Rel. 16. When this PUCCH resource is configured within PUCCH-Config, this PUCCH resource may be a Rel-15/16 PUCCH resource or may be a newly defined PUCCH resource for an HARQ-ACK for a multicast PDSCH.

One of PTM transmission schemes 1 and 2 may be defined in a specification. Both of PTM transmission schemes 1 and 2 may be defined in a specification, and one of the schemes may be configured by higher layer signaling. When both of PTM transmission schemes 1 and 2 are defined in a specification and DCI for scheduling a group-common PDSCH (multicast PDSCH) is group-common DCI by CRC scrambled with a group-common RNTI, the UE may judge that PTM transmission scheme 1 is used. When the DCI is UE-specific DCI with CRC scrambled by a UE-specific RNTI, the UE may judge that PTM transmission scheme 2 is used.

In PTM transmission scheme 1, the group-common DCI may be a new DCI format. The new DCI format may be DCI format 2_x. The UE may monitor the group-common DCI in a search space for multicast. The search space for multicast may be Type 3-PDCCH common search space (CSS), or search space type (searchSpaceType) in a PDCCH configuration (PDCCH-Config) may be common.

The UE may receive the configuration of a PUCCH resource for transmission of HARQ-ACK information for a PDSCH and control transmission of the HARQ-ACK information using the PUCCH resource.

The UE may receive DCI for scheduling a PDSCH and judge whether the PDSCH is multicast or unicast, based on at least one of higher layer signaling and the DCI.

First Embodiment

The UE scheduled with a multicast PDSCH by UE-specific DCI may follow at least one of Aspects 1-1 to 1-6 below.

<<Aspect 1-1>>

The UE scheduled with a multicast PDSCH by UE-specific DCI transmits an HARQ-ACK for the multicast PDSCH by using a UE-specific PUCCH resource.

The UE-specific PUCCH resource may follow one of resources A and B below.

{Resource A}

The UE may use a PUCCH resource configured by higher layer signaling, for the PUCCH resource for transmitting UCI including the HARQ-ACK for the multicast-PDSCH. DCI need not necessarily be used for the determination of a PUCCH resource. In this case, a PUCCH resource indicator (PRI) field can be omitted in the DCI for scheduling the multicast PDSCH, which can reduce the overhead of the DCI. Configuration by UE-dedicated higher layer signaling can allocate orthogonal resources between UEs.

{Resource B}

A plurality of PUCCH resources are configured by higher layer signaling, and the UE selects (determines) a PUCCH resource for transmitting the UCI including the HARQ-ACK for the multicast PDSCH from among the plurality of PUCCH resources, based on the scheduling DCI for the multicast PDSCH. In the example in FIG. 1, the UE selects (determines) one PUCCH resource set (from among a plurality of PUCCH resource sets configured by higher layer signaling), based on the number of bits (size) of the UCI including the HARQ-ACK for the multicast PDSCH, and selects (determines) one PUCCH resource from the selected PUCCH resource set, based on a PRI field in the DCI for scheduling the multicast PDSCH and the index of the first CCE of the PDCCH in which the DCI for scheduling the multicast PDSCH is detected.

<<Aspect 1-2>>

The UE scheduled with a multicast PDSCH by UE-specific DCI transmits an HARQ-ACK for the multicast PDSCH by using a UE-common PUCCH resource.

The UE-common PUCCH resource may follow one of resources A and B below.

{Resource A}

The UE may use a UE-common PUCCH resource configured by higher layer signaling, for the PUCCH resource for transmitting UCI including the HARQ-ACK for the multicast-PDSCH. In this case, a PUCCH resource used for transmission is dynamically indicated among a plurality of UE-common PUCCH resources. A PUCCH resource for HARQ-ACK transmission for the multicast PDSCH may be configured by higher layer signaling. HARQ-ACK feedback using this PUCCH resource may be NACK-only feedback.

{Resource B}

The UE determines a UE-common PUCCH resource, based on higher layer signaling and DCI. In the example in FIG. 2, a plurality of PUCCH resources for HARQ-ACK transmission for the multicast PDSCH are configured by higher layer signaling, and the UE selects (determines) one PUCCH resource from among the plurality of PUCCH resources thus configured, based on a PRI field in the DCI for scheduling the multicast PDSCH and the index of the first CCE of the PDCCH in which the DCI for scheduling the multicast PDSCH is detected. Configuration of the plurality of PUCCH resources for HARQ-ACK transmission for the multicast PDSCH may use a mechanism for determination of a PUCCH resource set. For example, the UE may select (determine) a PUCCH resource/PUCCH resource set according to the number of bits (size) of the UCI including the HARQ-ACK for the multicast PDSCH.

<<Aspect 1-3>>

One or more PUCCH resource sets for HARQ-ACK transmission for a multicast PDSCH are configured (by higher layer signaling), and the UE selects (determines), according to the number of bits (size) of UCI including the HARQ-ACK, a PUCCH resource set to be used for transmission of the UCI.

Whether the UE uses ACK/NACK feedback or NACK-only feedback for the HARQ-ACK transmission for the multicast PDSCH may follow one of the options 1 and 2 below.

{Option 1}

Whether the UE uses ACK/NACK feedback or NACK-only feedback for the HARQ-ACK transmission for the multicast PDSCH may be determined/configured/defined irrespective of the number of bits of the UCI. The UE need not necessarily switch between use of ACK/NACK feedback and use of NACK-only feedback for the HARQ-ACK transmission for the multicast PDSCH.

{Option 2}

Figure 5:
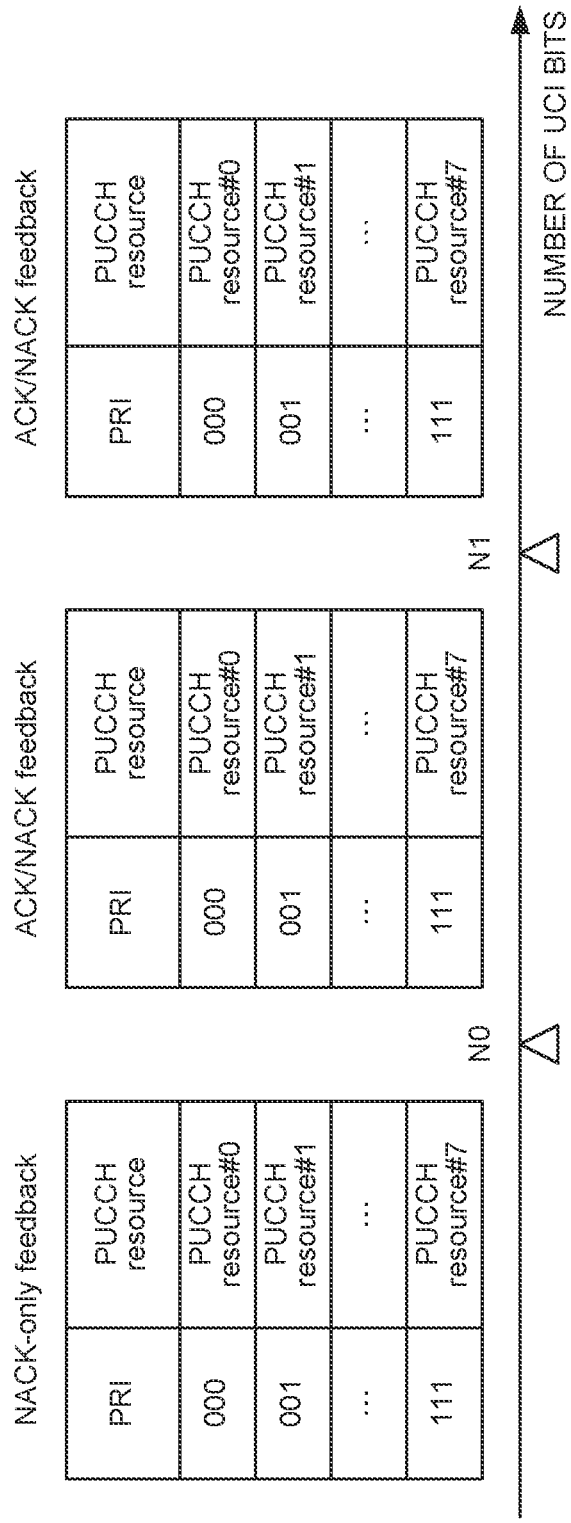
FIG. 5 is a diagram to show an example of a PUCCH resource configuration according to Aspect 1-3.

Whether the UE uses ACK/NACK feedback or NACK-only feedback for the HARQ-ACK transmission for the multicast PDSCH may be determined depending on the number of bits of the UCI. In the example in FIG. 5, assume a case in which a plurality of PUCCH resource sets are configured. In this case, when the number of UCI bits is N0 bits or less, NACK-only feedback is used, and when the number of UCI bits is more than N0 bits, ACK/NACK feedback (first PUCCH resource set, PUCCH resource set ID=0) is used. When the number of UCI bits is more than N0 bits and N1 bits or less, ACK/NACK feedback (second PUCCH resource set, PUCCH resource set ID=1) may be used. When the number of UCI bits is more than N1 bits, ACK/NACK feedback (third PUCCH resource set, PUCCH resource set ID=2) may be used. N0 may be two. N1 may be configured by higher layer signaling or may be a value defined in a specification. The NACK-only feedback may use PUCCH format 0.

<<Aspect 1-4>>

One or more PUCCH resource sets for HARQ-ACK transmission for a multicast PDSCH are configured (by higher layer signaling), and the UE selects (determines), according to the number of bits (size) of UCI including the HARQ-ACK, a PUCCH resource set to be used for transmission of the UCI.

Whether the UE uses a UE-specific PUCCH or UE-common PUCCH for the HARQ-ACK transmission for the multicast PDSCH may follow one of the options 1 and 2 below.

{Option 1}

Whether the UE uses a UE-specific PUCCH or UE-common PUCCH for the HARQ-ACK transmission for the multicast PDSCH may be determined/configured/defined irrespective of the number of bits of the UCI. The UE need not necessarily switch between use of a UE-specific PUCCH or a UE-common PUCCH for the HARQ-ACK transmission for the multicast PDSCH.

{Option 2}

Figure 6:
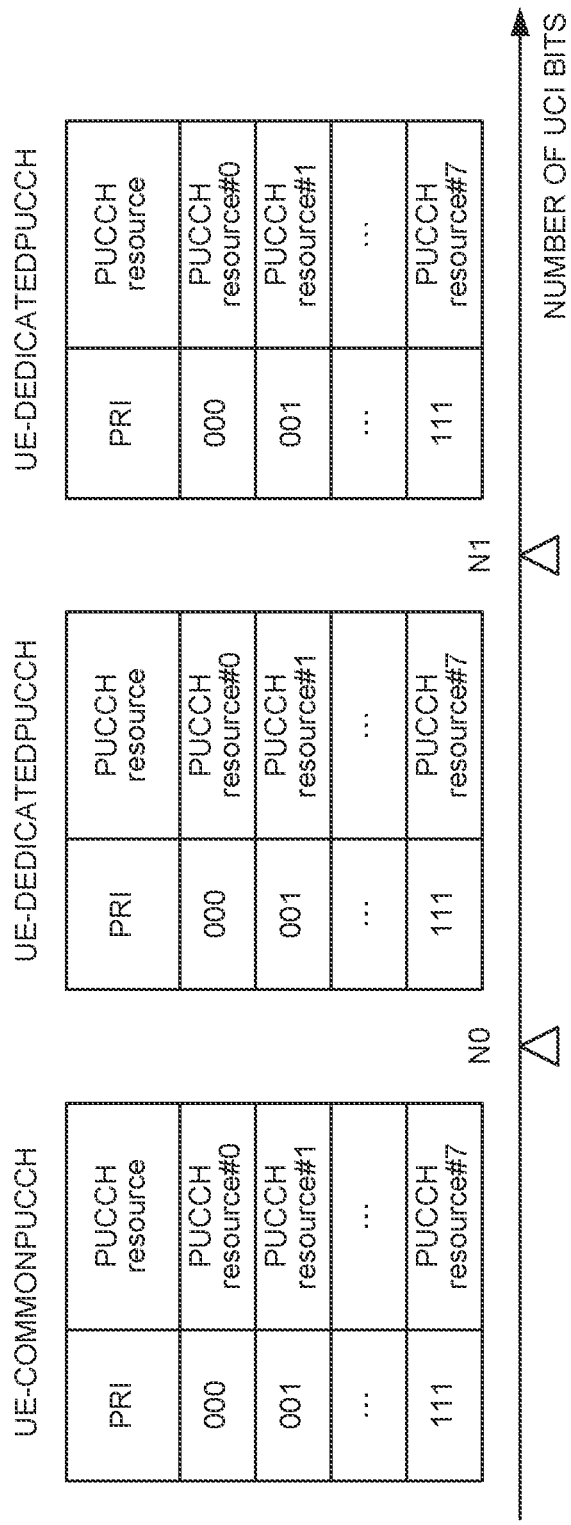
FIG. 6 is a diagram to show an example of a PUCCH resource configuration according to Aspect 1-4.

Whether the UE uses a UE-specific PUCCH or UE-common PUCCH for the HARQ-ACK transmission for the multicast PDSCH may be determined depending on the number of bits of the UCI. In the example in FIG. 6, assume a case in which a plurality of PUCCH resource sets are configured. In this case, when the number of UCI bits is N0 bits or less, a UE-common PUCCH is used, and when the number of UCI bits is more than N0 bits, a UE-specific PUCCH (first PUCCH resource set, PUCCH resource set ID=0) is used. When the number of UCI bits is more than N0 bits and N1 bits or less, a UE-specific PUCCH (second PUCCH resource set, PUCCH resource set ID=1) may be used. When the number of UCI bits is more than N1 bits, a UE-specific PUCCH (third PUCCH resource set, PUCCH resource set ID=2) may be used. N0 may be two. N1 may be configured by higher layer signaling or may be a value defined in a specification. The UE-common PUCCH may use PUCCH format 0.

<<Aspect 1-5>>

One or more PUCCH resource sets for HARQ-ACK transmission for a multicast PDSCH are configured (by higher layer signaling), and the UE selects (determines) a PUCCH resource set to be used for transmission of the UCI, according to a condition.

The condition may be at least one of the following conditions.

DCI format/DCI field
PDCCH monitoring occasion/CORESET/search space
RNTI by which CRC is scrambled
MAC CE Whether the UE uses ACK/NACK feedback or NACK-only feedback for the HARQ-ACK transmission for the multicast PDSCH may be determined according to this condition.

The UE may determine whether to use a UE-specific PUCCH or UE-common PUCCH for the HARQ-ACK transmission for the multicast PDSCH, according to this condition.

<<Aspect 1-6>>

Configuration of PUCCH resources/resource sets by higher layer signaling may follow one of configuration methods 1 and 2 below.

{Configuration Method 1}

Figure 7:
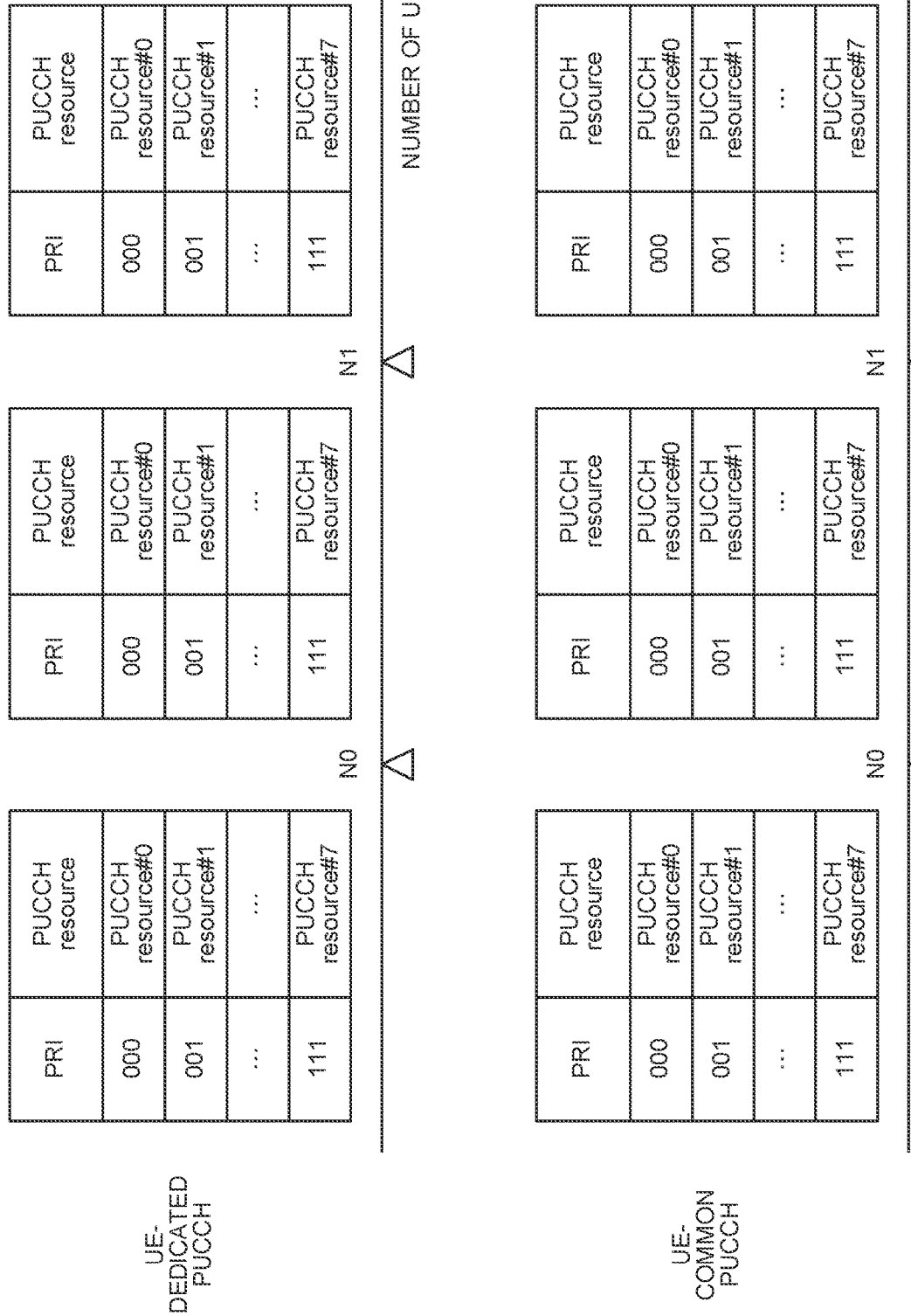
FIG. 7 is a diagram to show an example of a PUCCH resource configuration according to Configuration Method 1 of Aspect 1-6.

UE-specific PUCCH resources/resource sets and UE-common PUCCH resources/resource sets are configured separately. In the example in FIG. 7, UE-specific PUCCH resources/resource sets and UE-common PUCCH resources/resource sets are configured. The UE-specific PUCCH resources/resource sets may be PUCCH resources/resource sets for unicast PDSCH in Rel. 15/16. Separately from PUCCH resources/resource sets for unicast PDSCH, PUCCH resources/resource sets for multicast PDSCH may be configured.

{Configuration Method 2}

UE-specific PUCCH resources/resource sets and UE-common PUCCH resources/resource sets are configured commonly.

Figure 8:
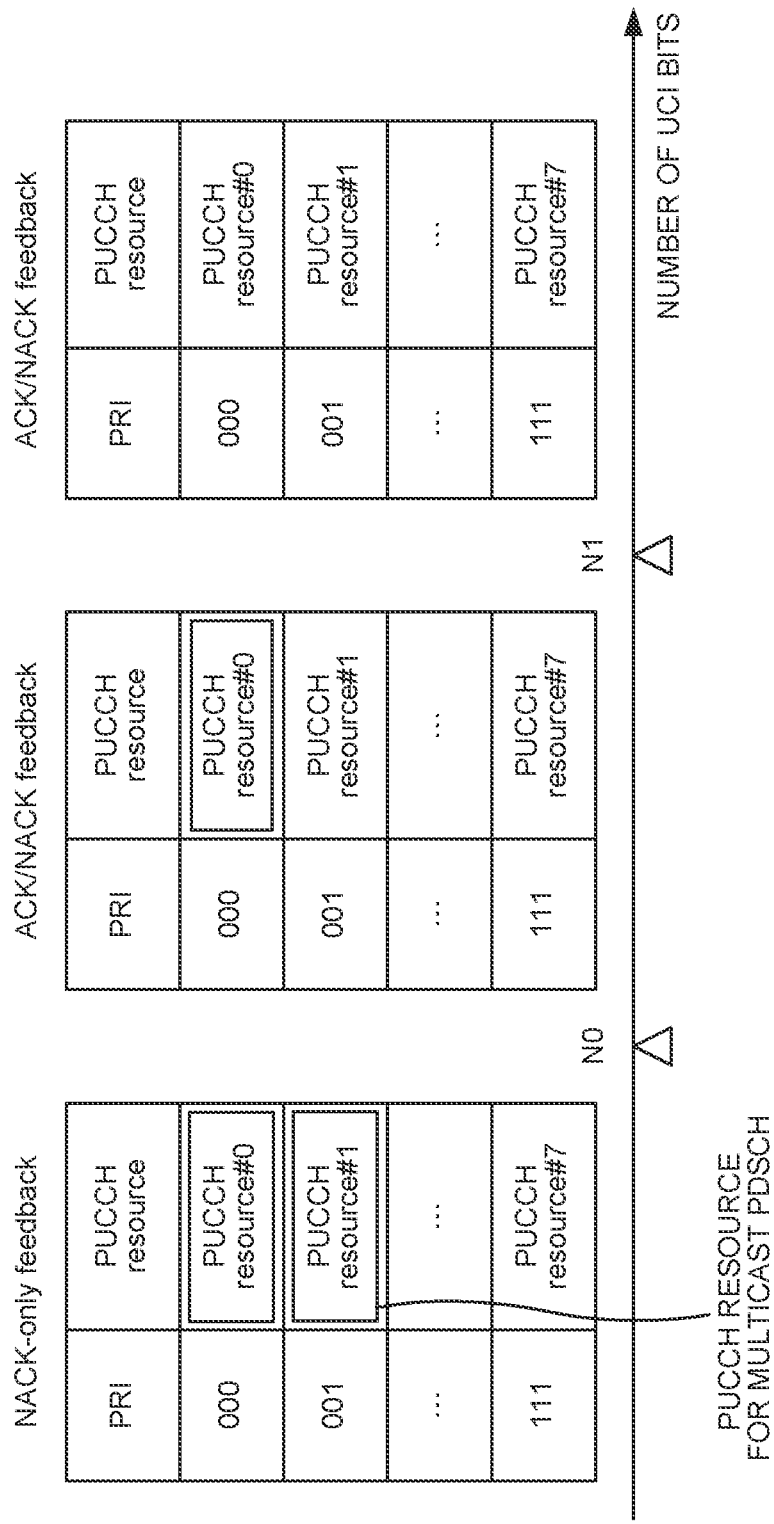
FIG. 8 is a diagram to show an example of a PUCCH resource configuration according to Configuration Method 2 of Aspect 1-6.

A UE-specific PUCCH resource or a UE-common PUCCH resource may be separately configured for each resource. For an HARQ-ACK for a unicast PDSCH, a UE-specific PUCCH resource may be indicated by DCI (PRI field/index of the first CCE). For an HARQ-ACK for a multicast PDSCH, a UE-common PUCCH resource may be indicated by DCI (PRI field/index of the first CCE). In the example in FIG. 8, a plurality of PUCCH resource sets are configured, and part of the plurality of PUCCH resource sets includes UE-specific PUCCH resources/UE-common PUCCH resources. The PUCCH resource set for a case where the number of UCI bits is N0 or less or N1 or less may include a UE-common PUCCH resource(s). The PUCCH resource set for a case where the number of UCI bits is more than N0 or N1 bits need not necessarily include any UE-common PUCCH resource. Each PUCCH resource/resource set may be a PUCCH resource/resource set for unicast PDSCH in Rel. 15/16. Separately from PUCCH resources/ resource sets for unicast PDSCH, PUCCH resources/resource sets for multicast PDSCH may be configured.

Each PUCCH resource may include an initial CS index. In ACK/NACK feedback, the UE may determine a CS for NACK, based on an index obtained by adding a first offset (for example, 0) to the initial CS index, and determine a CS for ACK, based on an index obtained by adding a second offset (for example, 6) to the initial CS index. In NACK-only feedback, the UE may determine a CS, based on the index obtained by adding the first offset (for example, 0) to the initial CS index. The UE may transmit a sequence based on a base sequence and a CS based on an ACK or a NACK, on a PUCCH.

According to this embodiment, when a multicast PDSCH is scheduled by UE-specific DCI, the UE can appropriately transmit HARQ-ACK information for the PDSCH.

Second Embodiment

The UE scheduled with a multicast PDSCH by UE-common DCI may follow at least one of Aspects 2-1 and 2-2 below.

<<Aspect 2-1>>

The UE scheduled with a multicast PDSCH by UE-common DCI transmits an HARQ-ACK for the multicast PDSCH by using a UE-specific PUCCH resource.

The UE-specific PUCCH resource may follow one of resources A and B below.

{Resource A}

The UE may use a PUCCH resource configured by higher layer signaling, for the PUCCH resource for transmitting UCI including the HARQ-ACK for the multicast-PDSCH. DCI need not necessarily be used for the determination of the PUCCH resource. In this case, a PUCCH resource indicator (PRI) field can be omitted in the DCI for scheduling the multicast PDSCH, which can reduce the overhead of the DCI. Configuration by UE-dedicated higher layer signaling can allocate orthogonal resources between UEs.

{Resource B}

A plurality of PUCCH resources are configured by higher layer signaling, and the UE selects (determines) a PUCCH resource in which the UCI including the HARQ-ACK for the multicast PDSCH from among the plurality of PUCCH resources, based on the scheduling DCI for the multicast PDSCH. In the example in FIG. 1, the UE selects (determines) one PUCCH resource set (from among a plurality of PUCCH resource sets configured by higher layer signaling), based on the number of bits (size) of the UCI including the HARQ-ACK for the multicast PDSCH, and selects (determines) one PUCCH resource from the selected PUCCH resource set, based on a PRI field in the DCI for scheduling the multicast PDSCH and the index of the first CCE of the PDCCH in which the DCI for scheduling the multicast PDSCH is detected.

The PRI may follow one of PRI fields 1 and 2 below.

{PRI Field 1}

In the example in FIG. 9A, a PRI field is enhanced, and a PRI (PRI0 to PRI3) is indicated (in a UE-specific manner) for each UE (UE0 to UE3). The UE is configured with a PRI field for the UE itself by higher layer signaling, and determines a PUCCH resource, based on the configured PRI field. The UE may ignore any PRI field not configured (for other UEs).

{PRI Field 2}

The PRI field is not enhanced. A PRI field in DCI format 1_1 may be three bits. A PRI field in DCI format 1_2 may be one to three bits. In the example in FIG. 9B, association (mapping) between the value of each PRI field and a PRI (PUCCH resource) for each UE is configured by higher layer signaling, and the UE determines a PUCCH resource by using the PRI (PUCCH resource) for the UE itself.

The UE can know the PUCCH resources of other UEs, and may control collision of channels, based on the PUCCH resources of other UEs.

The index of a CCE for determination of PUCCH resource set #0 (first PUCCH resource set) may be similar to that in Rel. 15. The index of each CCE may be common among the UEs. In order for common DCI to indicate a different PUCCH resource for each UE, the UE may determine a PUCCH resource by adding an offset to the CCE index. The offset may be configured by higher layer signaling for each UE (in a UE-dedicated manner) or determined according to a function based on a UE-ID/C-RNTI.

<<Aspect 2-2>>

The UE scheduled with a multicast PDSCH by UE-common DCI transmits an HARQ-ACK for the multicast PDSCH by using a UE-common PUCCH resource.

The UE-common PUCCH resource may follow one of resources A and B below.

{Resource A}

The UE may use a PUCCH resource configured by higher layer signaling, for the PUCCH resource for transmitting UCI including the HARQ-ACK for the multicast-PDSCH. DCI need not necessarily be used for the determination of the PUCCH resource. In this case, a PUCCH resource indicator (PRI) field can be omitted in the DCI for scheduling the multicast PDSCH, which can reduce the overhead of the DCI. Configuration by UE-dedicated higher layer signaling can allocate orthogonal resources between the UEs.

{Resource B}

A plurality of PUCCH resources are configured by higher layer signaling, and the UE selects (determines) a PUCCH resource for transmitting the UCI including the HARQ-ACK for the multicast PDSCH from among the plurality of PUCCH resources, based on the scheduling DCI for the multicast PDSCH. In the example in FIG. 2, the UE selects (determines) one PUCCH resource set (from among a plurality of PUCCH resource sets configured by higher layer signaling), based on the number of bits (size) of the UCI including the HARQ-ACK for the multicast PDSCH, and selects (determines) one PUCCH resource from the selected PUCCH resource set, based on a PRI field in the DCI for scheduling the multicast PDSCH and the index of the first CCE of the PDCCH in which the DCI for scheduling the multicast PDSCH is detected.

According to this embodiment, when a multicast PDSCH is scheduled by UE-common DCI, the UE can appropriately transmit HARQ-ACK information for the PDSCH.

Third Embodiment

When the UE receives a unicast PDSCH and a multicast PDSCH, the UE may follow one of Aspects 3-1 and 3-2 below for an HARQ-ACK for the unicast PDSCH and an HARQ-ACK for the multicast PDSCH.

<<Aspect 3-1>>

The UE multiplexes the HARQ-ACK for the unicast PDSCH and the HARQ-ACK for the multicast PDSCH into one channel (maps the HARQ-ACK for the unicast PDSCH and the HARQ-ACK for the multicast PDSCH to one channel). The channel may be a PUCCH or may be a PUSCH.

The UE may generate an HARQ-ACK bit sequence for the unicast PDSCH and the multicast PDSCH in a method of counting HARQ-ACKs of PDSCHs for existing semi-static/dynamic HARQ-ACK codebook (HARQ codebook) and transmit the generated HARQ-ACK bit sequence in one channel resource. In this case, since the UE only need perform one channel transmission, which can increase resource usage efficiency. Totaling (counting) for the total DAI/counter DAI may be performed over scheduling DCI for the unicast PDSCH and scheduling DCI for the multicast PDSCH.

The channel resources to which the HARQ-ACK for the unicast PDSCH and the HARQ-ACK for the multicast PDSCH are mapped may follow one of resources A and B below.

{Resource A}

In a PUCCH/PUSCH resource for unicast PDSCH, the UE transmits the HARQ-ACK for the unicast PDSCH and the HARQ-ACK for the multicast PDSCH. This channel resource is a UE-specific resource, which facilitates control.

The UE may multiplex the HARQ-ACK for the unicast PDSCH and the HARQ-ACK for the multicast PDSCH and select (determine) a PUCCH resource set according to the number of bits of UCI including the multiplexed HARQ-ACKs. The UE may select (determine) a PUCCH resource set according to the number of bits of UCI including the HARQ-ACK for the unicast PDSCH (the number of bits of UCI before the HARQ-ACK for the multicast PDSCH is multiplexed to the HARQ-ACK for the unicast PDSCH).

The UE may obtain DCI (PRI field/index of the first CCE) necessary for selection of a PUCCH resource, in accordance with an existing rule for selecting time/frequency direction DCI. Here, the UE need not necessarily differentiate the scheduling DCI for the unicast PDSCH and the scheduling DCI for the multicast PDSCH.

For example, the selection rule may be the last DCI format among DCI formats numbered in ascending order of serving cell indices for the same PDCCH monitoring occasion and numbered in ascending order of PDCCH monitoring occasion indices.

The UE may obtain DCI (PRI field/index of the first CCE) necessary for selection of a PUCCH resource, in accordance with an existing rule for selecting time/frequency direction DCI, for each of the scheduling DCI for the unicast PDSCH and the scheduling DCI for the multicast PDSCH. Here, the UE need not necessarily differentiate the scheduling DCI for the unicast PDSCH and the scheduling DCI for the multicast PDSCH. The UE may obtain DCI (PRI field/index of the first CCE) necessary for selection of a PUCCH resource, in accordance with an existing rule for selecting time/frequency direction DCI, for the scheduling DCI for the unicast PDSCH.

{Resource B}

In a PUCCH/PUSCH resource for multicast PDSCH, the UE transmits the HARQ-ACK for the unicast PDSCH and the HARQ-ACK for the multicast PDSCH. This channel resource is a dedicated resource, which facilitates control.

The UE may multiplex the HARQ-ACK for the unicast PDSCH and the HARQ-ACK for the multicast PDSCH and select (determine) a PUCCH resource set according to the number of bits of UCI including the multiplexed HARQ-ACKs. The UE may select (determine) a PUCCH resource set according to the number of bits of UCI including the HARQ-ACK for the multicast PDSCH (the number of bits of UCI before the HARQ-ACK for the multicast PDSCH is multiplexed to the HARQ-ACK for the unicast PDSCH).

The UE may obtain DCI (PRI field/index of the first CCE) necessary for selection of a PUCCH resource, in accordance with an existing rule for selecting time/frequency direction DCI. Here, the UE need not necessarily differentiate the scheduling DCI for the unicast PDSCH and the scheduling DCI for the multicast PDSCH.

For example, the selection rule may be the last DCI format among DCI formats numbered in ascending order of serving cell indices for the same PDCCH monitoring occasion and numbered in ascending order of PDCCH monitoring occasion indices.

The UE may obtain (PRI field/index of the first CCE) necessary for selection of a PUCCH resource, in accordance with an existing rule for selecting time/frequency direction DCI, for each of the scheduling DCI for the unicast PDSCH and the scheduling DCI for the multicast PDSCH. Here, the UE need not necessarily differentiate the scheduling DCI for the unicast PDSCH and the scheduling DCI for the multicast PDSCH. The UE may obtain (PRI field/index of the first CCE) necessary for selection of a PUCCH resource, in accordance with an existing rule for selecting time/frequency direction DCI, for the scheduling DCI for the multicast PDSCH.

As a method of transmitting the HARQ-ACK for the multicast PDSCH, when NACK-only feedback is defined/configured, HARQ-ACK information to be transmitted may be calculated by logical operation between the HARQ-ACK for the unicast PDSCH and the HARQ-ACK for the multicast PDSCH. An HARQ-ACK information bit being 0 may indicate NACK, while an HARQ-ACK information bit being 1 may indicate ACK. The logical operation may be AND operation. For example, when the HARQ-ACK information bit for the multicast PDSCH is 1 (ACK) and the HARQ-ACK information bit for the unicast PDSCH is 0 (NACK), the result of the logical operation is 0, and hence the UE may transmit a NACK in NACK-only feedback.

When the HARQ-ACK for the unicast PDSCH and the HARQ-ACK for the multicast PDSCH are mapped to (multiplexed into) one channel, the bits of the HARQ-ACKs may be ordered according to at least one of the types indicating unicast PDSCH or multicast PDSCH (the cast types of PDSCHs), the slot indices of PDSCHs, and the cell indices of PDSCHs. When the HARQ-ACKs are ordered according to the cast types of PDSCHs, the order may be the HARQ-ACK for the unicast PDSCH and then the HARQ-ACK for the multicast PDSCH or the HARQ-ACK for the multicast PDSCH and then the HARQ-ACK for the unicast PDSCH. The bits of the HARQ-ACKs may be ordered according to at least one of the cast type of the PDSCH and the cell index of the PDSCH for each slot of the PDSCH.

<<Aspect 3-2>>

The UE does not multiplex the HARQ-ACK for the unicast PDSCH and the HARQ-ACK for the multicast PDSCH into one channel (maps the HARQ-ACK for the unicast PDSCH and the HARQ-ACK for the multicast PDSCH to different channels). Each channel may be a PUCCH or may be a PUSCH.

The UE may separately generate an HARQ-ACK bit sequence for the unicast PDSCH and an HARQ-ACK bit sequence for the multicast PDSCH and transmit the HARQ-ACK bit sequences in separate channel resources. The UE may generate HARQ-ACK bits for the multicast PDSCH in an existing method of counting HARQ-ACKs of PDSCHs for a semi-static/dynamic HARQ-ACK codebook. In this case, HARQ-ACK transmission for the multicast PDSCH does not affect HARQ-ACK transmission for the unicast PDSCH. Totaling (counting) for the total DAI/counter DAI may be performed separately for the scheduling DCI for the unicast PDSCH and the scheduling DCI for the multicast PDSCH.

When simultaneous transmissions of the HARQ-ACK for the multicast PDSCH and the HARQ-ACK for the unicast PDSCH occur (occasions overlap), the UE may prioritize the HARQ-ACK transmission for the unicast PDSCH (may drop the HARQ-ACK transmission for the multicast PDSCH) or may prioritize the HARQ-ACK transmission for the multicast PDSCH (may drop the HARQ-ACK transmission for the unicast PDSCH).

In a given slot (or a subslot), the UE may transmit only one of a PUCCH carrying the HARQ-ACK for the unicast PDSCH and a PUCCH carrying the HARQ-ACK for the multicast PDSCH. The UE indicated to perform feedback for both the unicast PDSCH and the multicast PDSCH (by a PDSCH-to-HARQ feedback indicator field) in a given slot (or a subslot) may drop feedback for one of the PDSCHs. It may be defined that it is not assumed that the UE is indicated to perform feedback for both the unicast PDSCH and the multicast PDSCH in a given slot (or a subslot).

When the UE reports, through UE capability information, support of (simultaneous/multiplexed/intra-channel) transmissions of both the HARQ-ACK for the multicast PDSCH and the HARQ-ACK for the unicast PDSCH and simultaneous transmissions of the HARQ-ACK for the multicast PDSCH and the HARQ-ACK for the unicast PDSCH occur (occasions overlap), the UE may transmit both the HARQ-ACK for the multicast PDSCH and the HARQ-ACK for the unicast PDSCH. In this case, the UE may time division multiplex (TDM) and transmit, or may transmit, by employing Aspect 3-1, the HARQ-ACK for the multicast PDSCH and the HARQ-ACK for the unicast PDSCH.

The UE may differentiate/identify DCI for multicast PDSCH and DCI for unicast PDSCH (follow at least one of fifth to ninth embodiments).

According to this embodiment, the UE can appropriately transmit HARQ-ACK information for a unicast PDSCH and a multicast PDSCH.

Fourth Embodiment

In at least one of the first to third embodiments, a method of determining a PUCCH resource (for example, a method of determining a PRI) may be applied to determination of a TPC command for PUCCH (TPC command field for scheduled PUCCH)/HARQ timing (PDSCH-to-HARQ_feedback timing indicator field).

According to this embodiment, the UE can appropriately determine TPC command/HARQ timing for PUCCH.

Fifth Embodiment

In PTM transmission scheme 2, the UE judges, based on resource allocation for a PDSCH scheduled by DCI, whether the PDSCH is a unicast PDSCH or multicast PDSCH (whether the DCI schedules a unicast PDSCH or schedule a multicast PDSCH).

A resource dedicated to multicast PDSCH and a resource dedicated to unicast PDSCH may be configured by higher layer signaling. Depending on whether the resource of the scheduled PDSCH corresponds to the resource dedicated to multicast PDSCH or the resource dedicated to unicast PDSCH, the UE may determine whether the PDSCH is a unicast PDSCH or a multicast PDSCH. The resource may be of the time domain/frequency domain/code domain (sequence/cyclic shift)/spatial domain. A frequency domain resource may be a physical resource element (PRE)/physical resource block (PRB)/BWP/CC.

Figure 10A:
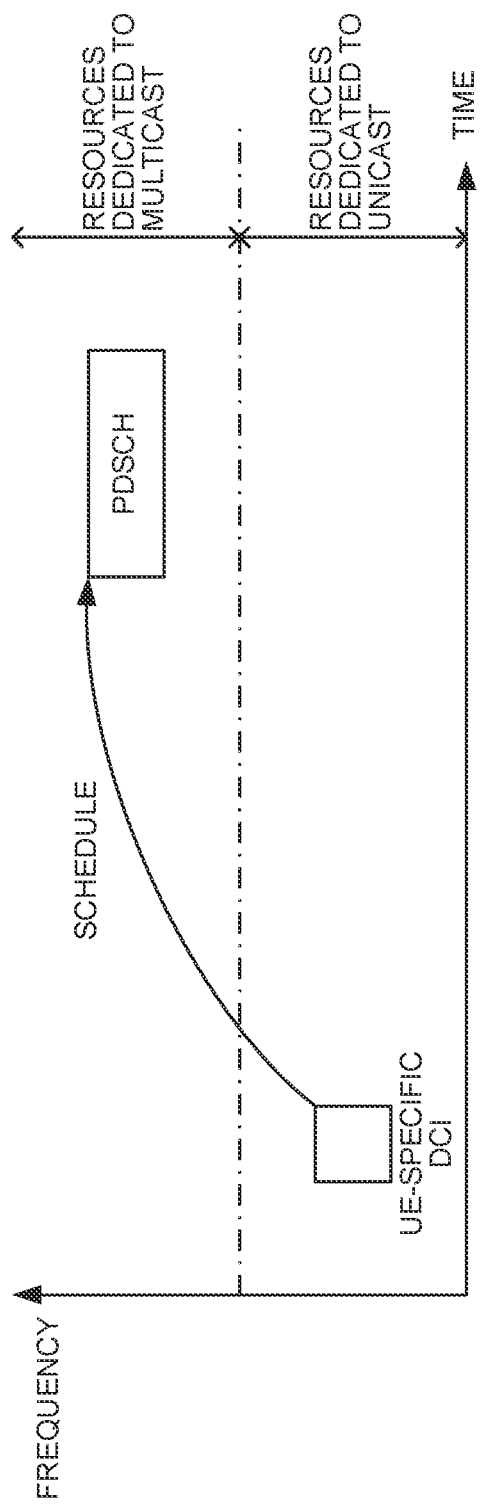
FIGS. 10A and 10B are diagrams to show examples of a method of judging a multicast PDSCH/unicast PDSCH according to a fifth embodiment.
Figure 10B:
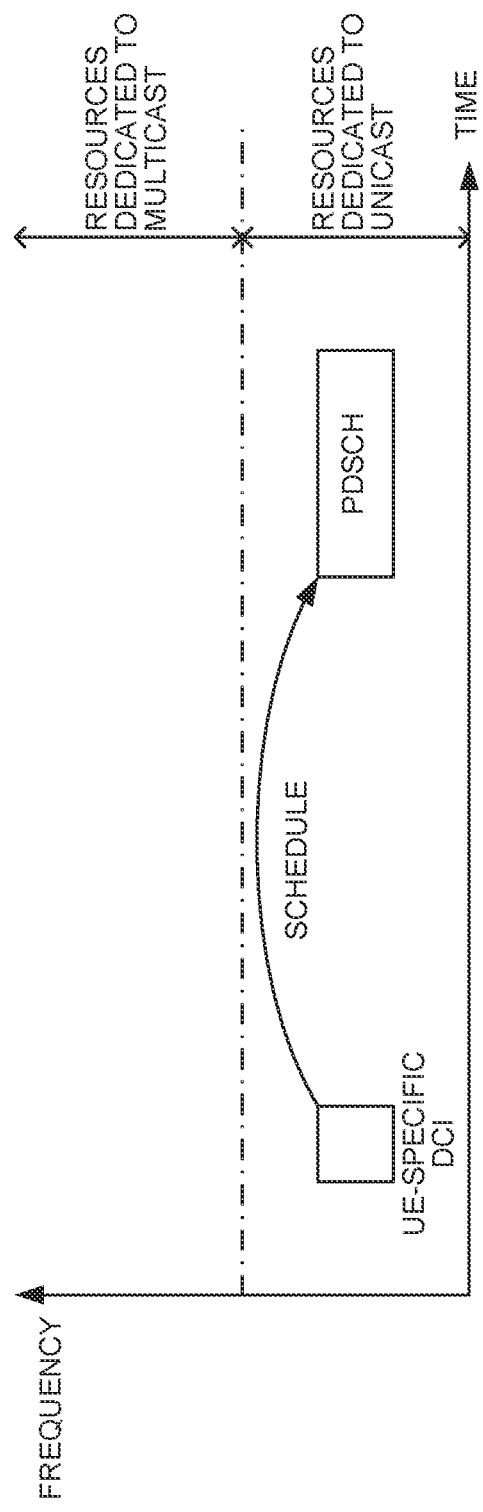

In the examples in FIGS. 10A and 10B, frequency domain resources for multicast PDSCH and frequency domain resources for unicast PDSCH are configured. In the example in FIG. 10A, when the frequency domain resource of a PDSCH scheduled by UE-specific DCI is within the frequency domain resources for multicast PDSCH, the UE judges that the PDSCH is a multicast PDSCH. In the example in FIG. 10B, when the frequency domain resource of a PDSCH scheduled by UE-specific DCI is within the frequency domain resources for unicast PDSCH, the UE judges that the PDSCH is a unicast PDSCH.

One of the resources for unicast and resources for multicast may be included in (may be surrounded by) the other. For example, part in the resources for unicast may be hollowed out (include a hole), and the part may correspond to resources for multicast.

According to this embodiment, the UE can appropriately judge whether a PDSCH scheduled by DCI is a unicast PDSCH or a multicast PDSCH.

Sixth Embodiment

In PTM transmission scheme 2, the UE judges, based on a reception/detection result of DCI for scheduling a PDSCH, whether the PDSCH is a unicast PDSCH or multicast PDSCH (whether the DCI schedules a unicast PDSCH or schedule a multicast PDSCH).

The UE may judge whether the scheduled PDSCH is a unicast PDSCH or a multicast PDSCH, based on at least one of Aspects 6-1 to 6-4 below.

<<Aspect 6-1>>

A CORESET/search space dedicated to UE-specific DCI for scheduling a multicast PDSCH (CORESET/search space dedicated to multicast) is configured.

When the UE detects DCI in the CORESET/search space dedicated to multicast, the UE may judge that this DCI schedules a multicast PDSCH. When the UE detects DCI in a CORESET/search space other than this, the UE may judge that this DCI is similar to that in Rel. 15/16 (this DCI does not schedule a multicast PDSCH).

Figure 11:
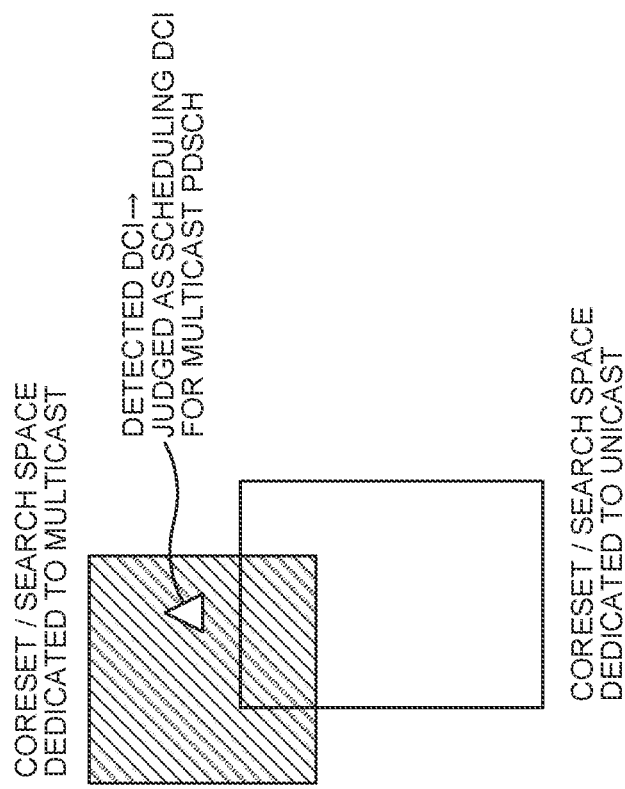
FIG. 11 is a diagram to show an example of a method of judging a multicast PDSCH/unicast PDSCH according to Aspect 6-1.

In the example in FIG. 11, a CORESET/search space dedicated to multicast and a CORESET/search space dedicated to unicast are configured. When the UE detects DCI in the CORESET dedicated to multicast, the UE judges that this DCI schedules a multicast PDSCH. The CORESET/search space dedicated to multicast and the CORESET/search space dedicated to unicast may overlap but need not necessarily overlap.

Group-common DCI in PTM transmission scheme 1 may use a CORESET/search space dedicated to multicast or may use a CORESET/search space dedicated to group-common DCI. By considering beam management, the UE assumes a configured TCI state in reception of UE-specific DCI. In reception of group-common DCI received by a plurality of UEs, a plurality of monitoring occasions corresponding to a plurality of respective TCI states are configured, and the UE need select a monitoring occasion corresponding to the TCI state of the UE itself. Hence, the search space for UE-specific DCI and the search space for group-common DCI may be configured separately.

When the time/frequency resources of the CORESET/search space dedicated to multicast overlap the time/frequency resources of the CORESET/search space other than the above, a case is conceivable where the UE cannot judge to which CORESET/search space detected DCI belongs. To avoid this, a base station may configure a different sequence ID for each CORESET/search space and use a different sequence for a DMRS of a PDCCH corresponding to each CORESET/search space. In this way, even when the time/frequency resources of the CORESET/search space dedicated to multicast overlap the time/frequency resources of the CORESET/search space other than the above, the UE can judge to which CORESET/search space detected DCI belongs.

DCI for scheduling a multicast PDSCH may be DL assignment DCI such as DCI format 1_1/1_2. In this case, an increase of the number of blind detection times can be prevented. The DCI for scheduling a multicast PDSCH may be a new DCI format for multicast PDSCH. When the new DCI format is defined, the UE may attempt blind detection only in a case where configuration is made by higher layer signaling.

By using a CORESET/search space dedicated to multicast, resources to monitor DCI can be limited, which can suppress UE power consumption.

<<Aspect 6-2>>

A new field may be defined in an existing DCI format. The new field may indicate whether a PDSCH scheduled by the DCI format is a multicast PDSCH or a unicast PDSCH. The existing DCI format may be DCI format 1_1/1_2. Only when use of the new field is configured by higher layer signaling, the new field may be present in the existing DCI format.

Figure 12:
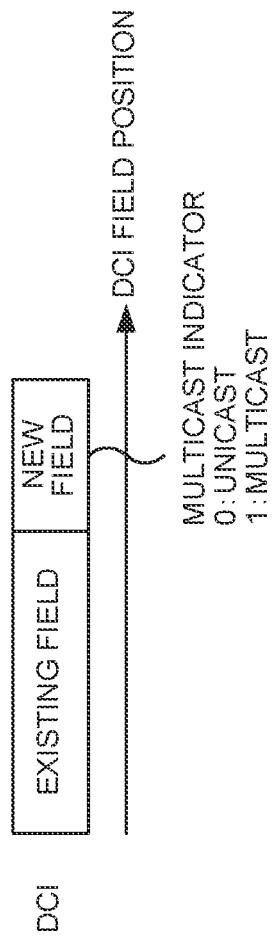
FIG. 12 is a diagram to show an example of a method of judging a multicast PDSCH/unicast PDSCH according to Aspect 6-2.

In the example in FIG. 12, an existing DCI format includes an existing field and a new field. When the value of the new field is 0, this indicates that this DCI schedules a unicast PDSCH. When the value of the new field is 1, this indicates that this DCI schedules a multicast PDSCH.

<<Aspect 6-3>>

A new UE-specific RNTI may be defined. When the UE detects DCI with CRC scrambled by the new RNTI, the UE may judge that this DCI schedules a multicast PDSCH. Only when scheduling of a multicast PDSCH (new RNTI) is configured by higher layer signaling, the UE may attempt to detect DCI with CRC scrambled by the new RNTI.

<<Aspect 6-4>>

When some special values of some special fields in an existing DCI format are decoded, the UE may regard (judge, confirm, validate) that the DCI schedules a multicast PDSCH.

Otherwise, the UE may regard that the DCI schedules a unicast PDSCH. The existing DCI format may be at least one of DCI formats 0_1, 0_2, 1_1, 1_2, and 2_3. Combinations of the special fields and special values may be at least one of the following.

The values of a frequency domain resource allocation field are all set to 0 or all set to 1.
The values of a time domain resource allocation field are all set to 0 or all set to 1.
The values of a frequency hopping flag field are all set to 0 or all set to 1.
The values of a modulation and coding scheme (MCS) field are all set to 0 or all set to 1.
The values of a new data indicator (NDI) field are all set to 0 or all set to 1.
The values of a redundancy version field are all set to 0 or all set to 1.
The values of an HARQ process number field are all set to 0 or all set to 1.
The values of a downlink allocation indicator (DAI) field are all set to 0 or all set to 1.
The values of a PUCCH transmission power control (TPC) command field are all set to 0 or all set to 1.
The values of a PUSCH transmission power control (TPC) command field are all set to 0 or all set to 1.
The values of an SRS resource indicator field are all set to 0 or all set to 1.
The values of a precoding information and number of layers field are all set to 0 or all set to 1.
The values of an antenna port field are all set to 0 or all set to 1.
The values of a CSI request field are all set to 0 or all set to 1.

In one of Aspects 6-1 to 6-4, at least one (special DCI field) of one or more DCI fields or a DCI field configured by a higher layer may indicate that this DCI schedules a multicast PDSCH.

In one of Aspects 6-1 to 6-4, the number of bits (size) of DCI for scheduling a multicast PDSCH may be the same as or different from the number of bits of DCI for scheduling a unicast PDSCH.

After the UE judges that the received DCI schedules a multicast PDSCH, the UE may acquire resource allocation information of the multicast PDSCH by using the value of each indication field in the DCI. Resource allocation information for unicast PDSCH and resource allocation information for multicast PDSCH may be configured by higher layer signaling. When the resource allocation information for multicast PDSCH is not configured (provided), the UE may use the resource allocation information for unicast PDSCH, for a multicast PDSCH. The resource allocation information may include frequency domain resource assignment (FDRA)/time domain resource assignment (TDRA)/DMRS information (CDM group index).

Figure 13:
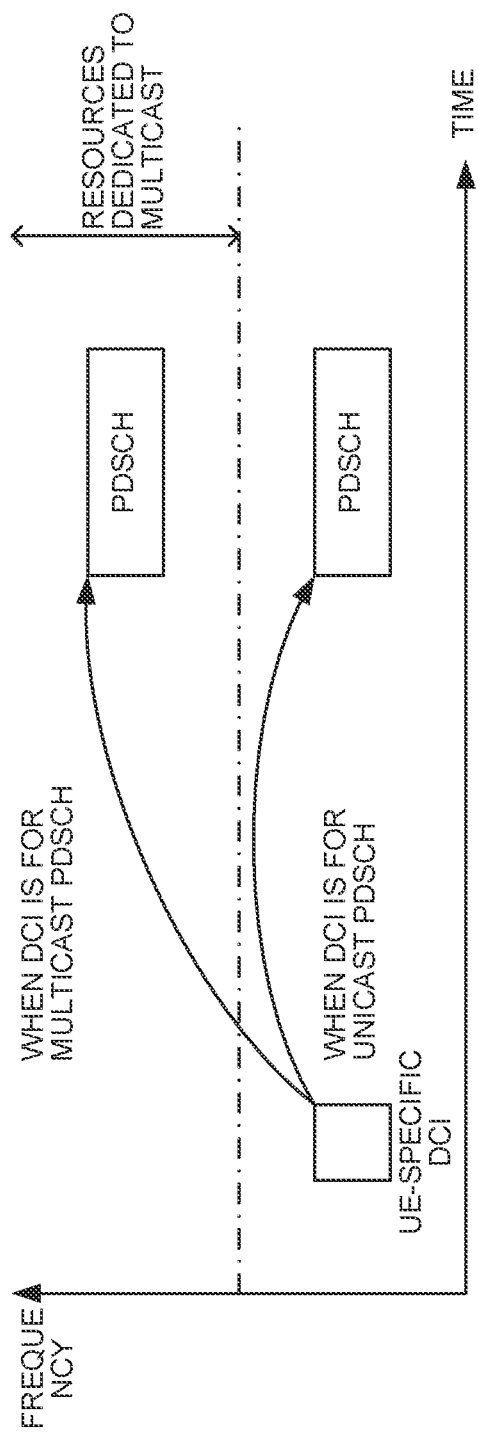
FIG. 13 is a diagram to show an example of PDSCH scheduling according to a sixth embodiment.

In the example in FIG. 13, when the UE judges that UE-specific DCI schedules a multicast PDSCH, the UE may determine a resource for the multicast PDSCH, based on configured resource allocation information for multicast and the DCI. When the UE judges that UE-specific DCI schedules a unicast PDSCH, the UE may determine a resource for the unicast PDSCH, based on configured resource allocation information for unicast and the DCI. One value of a field indicating resource allocation in the DCI may indicate a different resource depending on whether the DCI schedules a multicast PDSCH or schedules a unicast PDSCH.

A resource for multicast PDSCH may be referred to as a common frequency resource or may be a resource recognized commonly among a plurality of UEs. A method of allocating a resource for a multicast PDSCH may select/indicate a resource from among common frequency resources instead of being an existing resource allocation method of selecting/indicating a resource from a BWP.

In this case, a PDSCH is limited to resources for multicast, and hence a PDSCH resource can be specified flexibly by using a limited number of bits (for example, an FDMA field) in scheduling DCI, compared with the fifth embodiment.

According to this embodiment, the UE can appropriately judge whether a PDSCH scheduled by DCI is a unicast PDSCH or a multicast PDSCH.

Seventh Embodiment

In the fifth and sixth embodiments, operations for a case where PTM transmission scheme 2 is used have been mainly described. However, the fifth and sixth embodiments may be applied to a case where PTM transmission scheme 1 is used.

For example, by applying Aspect 6-1 to PTM transmission scheme 1, it may be restricted that DCI for PTM transmission scheme 1 is detected in a CORESET/search space dedicated to multicast. In this case, the UE can suppress processing amount of blind detection/CRC check of DCI for PTM transmission scheme 1, which can suppress UE power consumption.

Figure 14:
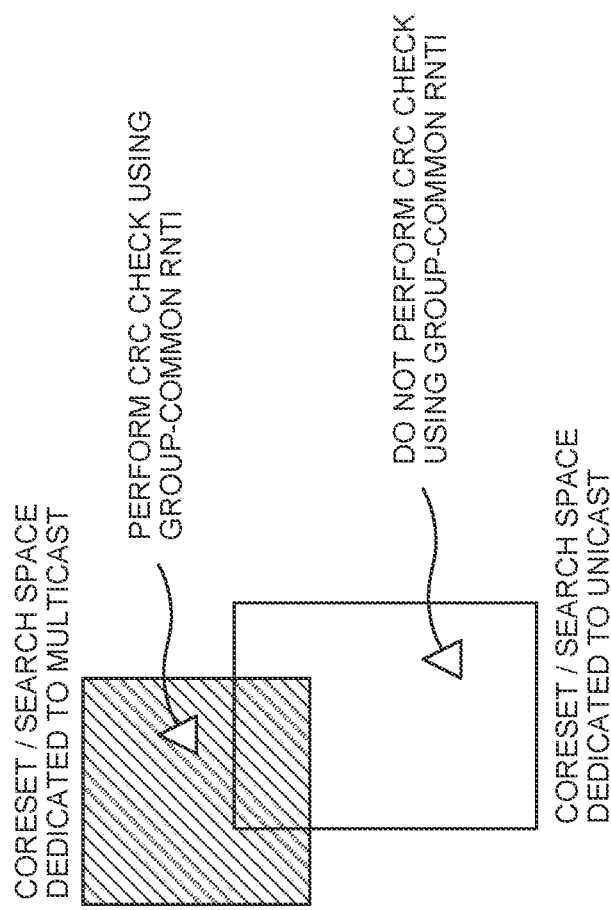
FIG. 14 is a diagram to show an example of PDCCH monitoring according to a seventh embodiment.

In the example in FIG. 14, a CORESET/search space dedicated to multicast and a CORESET/search space dedicated to unicast are configured. The UE performs check of CRC using a group-common RNTI based on PTM transmission scheme 1, only on DCI detected in the CORESET/search space dedicated to multicast. The UE does not perform check of CRC using a group-common RNTI based on PTM transmission scheme 1, on DCI detected in the CORESET/search space dedicated to unicast (does not assume that a multicast PDSCH is scheduled by this DCI).

In PTM transmission scheme 1/2, a new DCI format for multicast PDSCH scheduling may be defined. The UE may attempt blind detection of a new DCI format only in the CORESET/search space dedicated to multicast. A DMRS sequence used for the blind detection of a new DCI format may correspond to a sequence ID configured for the CORESET/search space dedicated to multicast. By limiting the blind detection of a new DCI format to within the CORESET/search space dedicated to multicast, UE power consumption can be suppressed.

Figure 15:
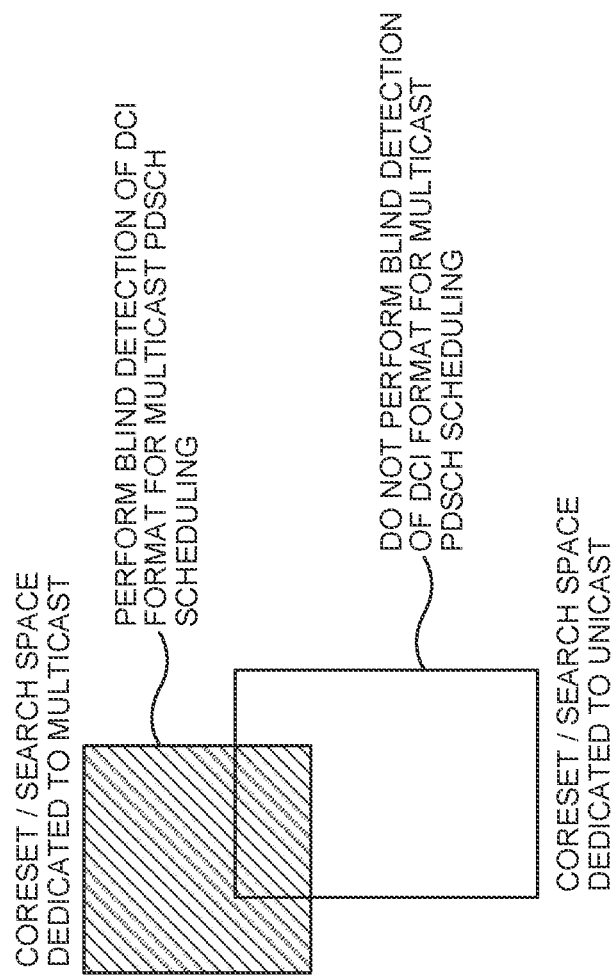
FIG. 15 is a diagram to show another example of the PDCCH monitoring according to the seventh embodiment.

In the example in FIG. 15, a CORESET/search space dedicated to multicast and a CORESET/search space dedicated to unicast are configured. The UE performs blind detection of a new DCI format in the CORESET/search space dedicated to multicast. The UE does not perform blind detection of a new DCI format in the CORESET/search space dedicated to unicast (does not assume to receive a new DCI format in the CORESET/search space dedicated to unicast).

According to this embodiment, the UE can appropriately judge whether a PDSCH scheduled by DCI is a unicast PDSCH or a multicast PDSCH.

Eighth Embodiment

In PTM transmission scheme 2, the UE judges whether a PDSCH is a unicast PDSCH or a multicast PDSCH, based on higher layer signaling. The higher layer signaling may be a MAC CE, for example.

A common resource allocation configuration may be used for a unicast PDSCH and a multicast PDSCH.

The UE may transmit a NACK when the UE has failed to receive/decode a PDSCH (unicast PDSCH/multicast PDSCH). PUCCH resources for NACK transmission may be common for a unicast PDSCH and a multicast PDSCH.

When the UE has successfully received/decoded a PDSCH (unicast PDSCH/multicast PDSCH), the UE may follow at least one of procedures 1 to 3 below.
{Procedure 1}
When the UE has been notified by higher layer signaling that the PDSCH is a unicast PDSCH and successfully received/decoded the PDSCH, the UE may transmit an ACK.
{Procedure 2}
When the UE has been notified by higher layer signaling that the PDSCH is a multicast PDSCH, configured/indicated with ACK/NACK feedback, and successfully received/decoded the PDSCH, the UE may transmit an ACK.
{Procedure 3}
When the UE has been notified by higher layer signaling that the PDSCH is a multicast PDSCH, configured/indicated with NACK-only feedback, and successfully received/decoded the PDSCH, the UE need not necessarily transmit an HARQ-ACK.

PUCCH resources for ACK transmission may be different between a unicast PDSCH and a multicast PDSCH.

A MAC subheader may indicate whether the PDSCH is a unicast PDSCH or a multicast PDSCH. A transport block (TB) may correspond to a MAC protocol data unit (PDU). The MAC PDU may include one or more MAC sub-PDU. The MAC sub-PDU may be one MAC subheader, may be one MAC subheader and one MAC service data unit (SDU), may be one MAC subheader and one MAC CE, or may be one MAC subheader and padding.

Until the UE successfully decodes the TB in the received PDSCH, the UE cannot recognize whether the PDSCH is a unicast PDSCH or a multicast PDSCH. In demodulation/decoding of the PDSCH, the physical (PHY) layer need not necessarily distinguish between a unicast PDSCH and a multicast PDSCH.

Whether the PDSCH is a unicast PDSCH or a multicast PDSCH may affect the following UE operation (HARQ-ACK feedback control).
{UE Operation}
The UE may decode the TB in the scheduled PDSCH, read higher layer signaling (for example, a MAC subheader) included in the TB, and judge whether the TB is unicast or multicast. The UE may perform HARQ-ACK feedback control according to the result of the judgment. The HARQ-ACK feedback control may include at least one of creation of an HARQ-ACK information bit sequence, determination of a PUCCH resource, and PUCCH transmission.

Only when configuration is made by higher layer signaling, the UE may perform this UE operation. The UE may perform this UE operation only on a PDSCH scheduled by a particular DCI format. The particular DCI format may be, for example, an existing DCI format (DCI format 1_1/1_2 or the like) or may be a new DCI format for multicast PDSCH scheduling. The UE may perform this UE operation only on a PDSCH scheduled by DCI with CRC scrambled by a particular RNTI. The particular RNTI may be a C-RNTI, for example.

A data scrambling RNTI for multicast PDSCH (PTM transmission scheme 2) may be a group-common RNTI. A data scrambling RNTI for unicast PDSCH may be a group-common RNTI. An existing data scrambling RNTI for unicast PDSCH is a C-RNTI. However, the UE need decode a PDSCH by using a particular RNTI before TB decoding, and hence the UE uses a data scrambling RNTI common to both a multicast PDSCH and a unicast PDSCH in this embodiment.

The data scrambling RNTI for each of multicast PDSCH and unicast PDSCH may be the RNTI used for CRC scrambling of corresponding scheduling DCI.

The data scrambling RNTI for multicast PDSCH (PTM transmission scheme 2) may be a group-common RNTI, while the data scrambling RNTI for unicast PDSCH may be the RNTI used for CRC scrambling of corresponding scheduling DCI (for example, the C-RNTI). The UE may use each of the data scrambling RNTI for multicast PDSCH and the data scrambling RNTI for unicast PDSCH to decode (blind decode) a PDSCH, and perform error determination for each TB/code word (CW)/code block group (CBG) to judge which data scrambling RNTI is used (whether the PDSCH is multicast or unicast).

In this way, when the UE judges a data scrambling RNTI by blind decoding of the PDSCH, the UE need not necessarily judge whether the PDSCH is multicast or unicast by higher layer signaling (for example, a MAC subheader) included in the TB. It may be defined, in this case, that the UE is not notified whether the PDSCH is multicast or unicast, by higher layer signaling (for example, a MAC subheader) included in the TB. In this case, control overhead can be suppressed.

The UE may judge a data scrambling RNTI by blind decoding of a PDSCH, judge whether the PDSCH is multicast or unicast by higher layer signaling (for example, a MAC subheader) included in the TB, and check whether the judged data scrambling RNTI is correct. In this case, reliability can be improved According to this embodiment, the UE can appropriately judge whether a PDSCH is a unicast PDSCH or a multicast PDSCH.

Ninth Embodiment

When a multicast PDSCH is configured by higher layer signaling, the UE may judge (assume) that DL assignment DCI with CRC scrambled by a C-RNTI schedules a multicast PDSCH (it may be defined that the UE does not assume that a unicast PDSCH is scheduled). When a multicast PDSCH is configured by higher layer signaling, the UE may judge (assume) that a particular DCI format schedules a multicast PDSCH. The particular DCI format may be, for example, an existing DCI format (DCI format 1_1/1_2 or the like) or may be a new DCI format for multicast PDSCH scheduling.

According to this embodiment, the UE can appropriately judge whether a PDSCH is a unicast PDSCH or a multicast PDSCH.

Tenth Embodiment

UE capability corresponding to at least one function (characteristics, feature) in the first to ninth embodiments may be defined. When the UE reports this UE capability, the UE may perform the corresponding function. When the UE reports this UE capability and is configured with a higher layer parameter corresponding to this function, the UE may perform the corresponding function. A higher layer parameter (RRC information element) corresponding to this function may be defined. When the UE is configured with this higher layer parameter, the UE may perform the corresponding function.

The UE capability may indicate whether the UE supports this function.

The UE capability may indicate whether to support PTM transmission scheme 1.

The UE capability may indicate whether to support PTM transmission scheme 2.

The UE capability may indicate whether to support a CORESET/search space dedicated to multicast. The UE capability may indicate the maximum number (supported number) of CORESETs/search spaces dedicated to multicast.

The UE capability may indicate a method of transmitting an HARQ-ACK for a multicast PDSCH (ACK/NACK feedback or NACK-only feedback).

The UE capability may indicate a method of scheduling a multicast PDSCH (UE-specific DCI or UE-common DCI).

The UE capability may indicate whether to support (simultaneous/multiplexed/intra-channel) transmissions of both an HARQ-ACK for a multicast PDSCH and an HARQ-ACK for a unicast PDSCH.

According to this embodiment, the UE can implement the above functions while maintaining compatibility with existing specifications.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 16:
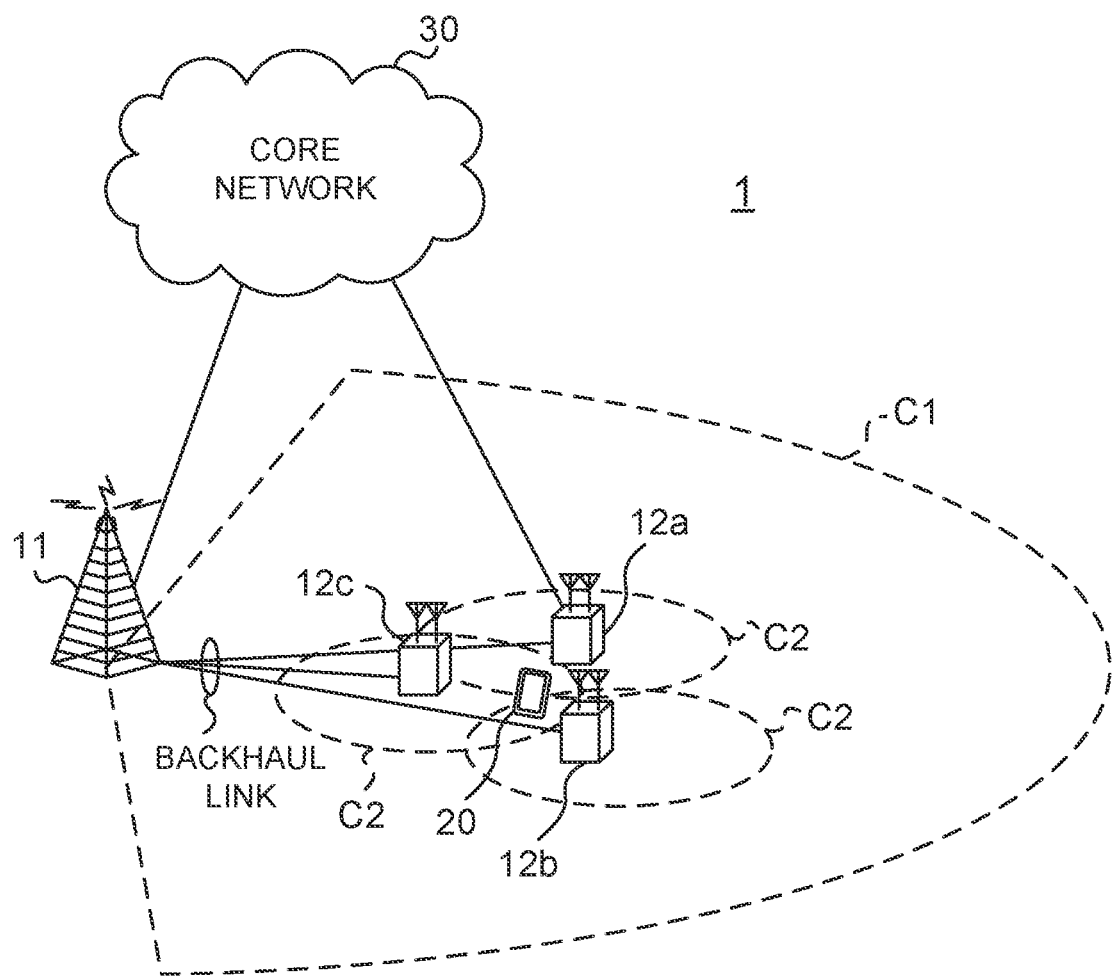
FIG. 16 is a diagram to show an example of a schematic structure of a radio communication system according to one embodiment.

FIG. 16 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a given search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 17:
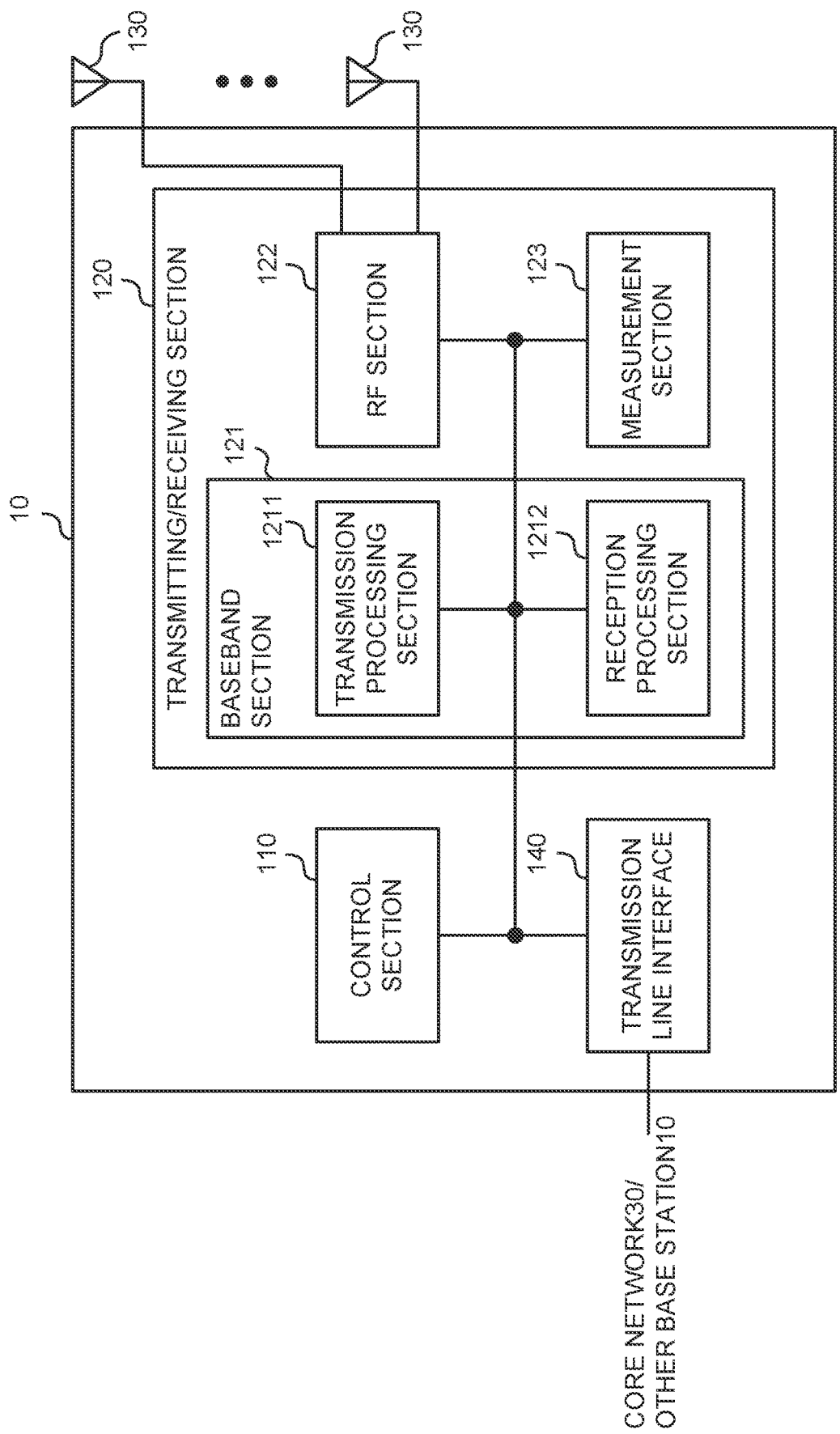
FIG. 17 is a diagram to show an example of a structure of a base station according to one embodiment.

FIG. 17 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RPUM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

The transmitting/receiving section 120 may transmit a configuration of a physical uplink control channel (PUCCH) resource for transmission of hybrid automatic repeat reQuest acknowledgement (HARQ-ACK) information for a multicast physical downlink shared channel (PDSCH). The control section 110 may control reception of the HARQ-ACK information using the PUCCH resource.

The transmitting/receiving section 120 may transmit, based on whether a physical downlink shared channel (PDSCH) is multicast or unicast, at least one of higher layer signaling and downlink control information for scheduling the PDSCH. The control section 110 may control reception of the PDSCH.

(User Terminal)

Figure 18:
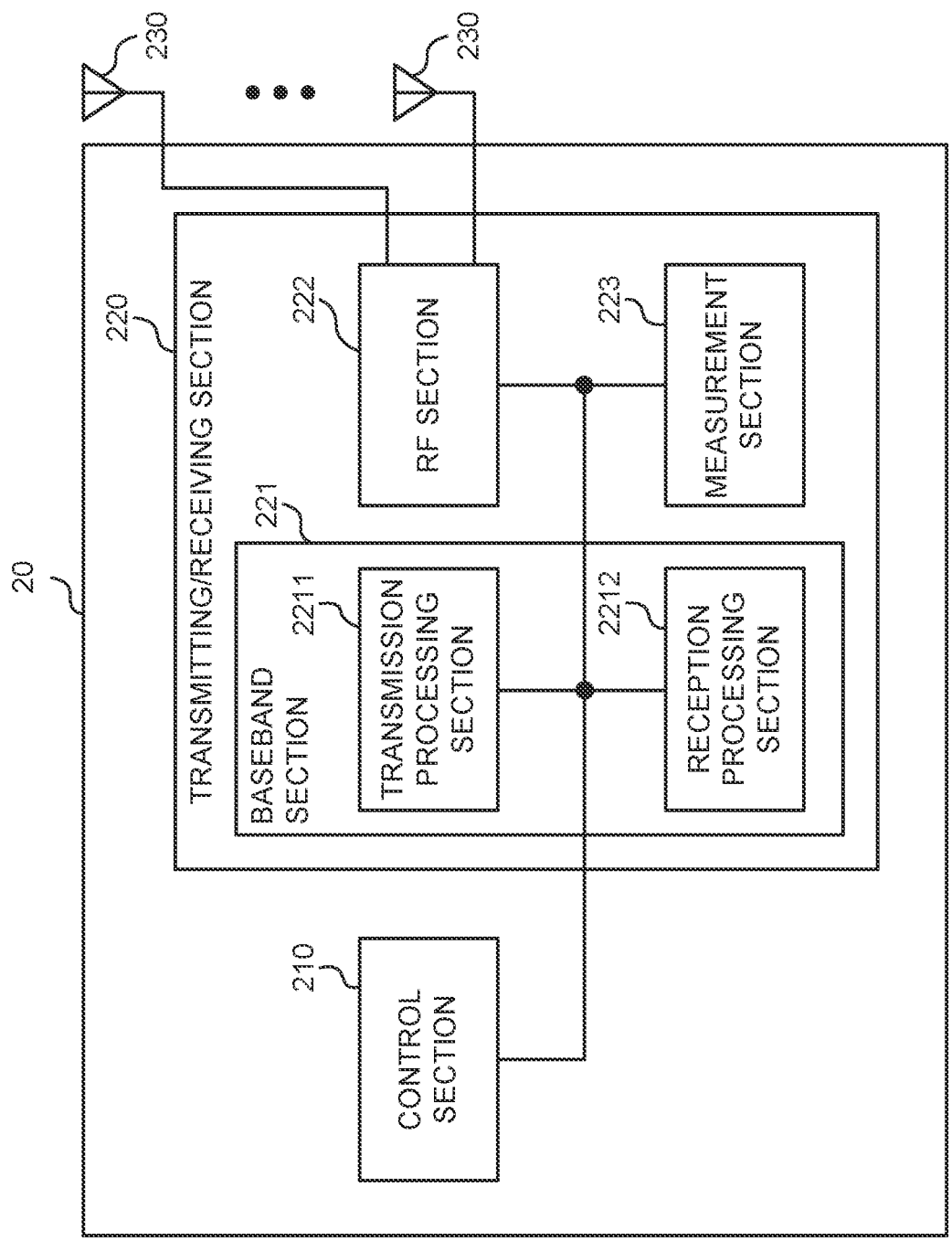
FIG. 18 is a diagram to show an example of a structure of a user terminal according to one embodiment.

FIG. 18 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a given channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

The transmitting/receiving section 220 may receive a configuration of a physical uplink control channel (PUCCH) resource for transmission of hybrid automatic repeat reQuest acknowledgement (HARQ-ACK) information for a multicast physical downlink shared channel (PDSCH). The control section 110 may control transmission of the HARQ-ACK information using the PUCCH resource (first to fourth embodiments).

The multicast PDSCH may be scheduled by one of terminal-specific downlink control information and terminal-common downlink control information (first and second embodiments).

The configuration may be one of a terminal-specific configuration and a terminal-common configuration (first and second embodiments).

The control section 210 may control transmission of the HARQ-ACK information in one of a same channel as that of second HARQ-ACK information for a unicast PDSCH and a different channel from that for the second HARQ-ACK information (third embodiment).

The transmitting/receiving section 220 may receive downlink control information for scheduling a physical downlink shared channel (PDSCH). The control section 210 may judge whether the PDSCH is multicast or unicast, based on at least one of higher layer signaling and the downlink control information (fifth to tenth embodiments).

The downlink control information may be terminal-specific downlink control information (fifth and sixth embodiments).

The transmitting/receiving section 220 may receive a configuration of a multicast PDSCH. When a resource indicated by the downlink control information is included in the configuration, the control section 210 may judge that the PDSCH is multicast (fifth embodiment).

When the downlink control information satisfies a condition, the control section 210 may judge that the PDSCH is multicast (sixth embodiment).

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 19:
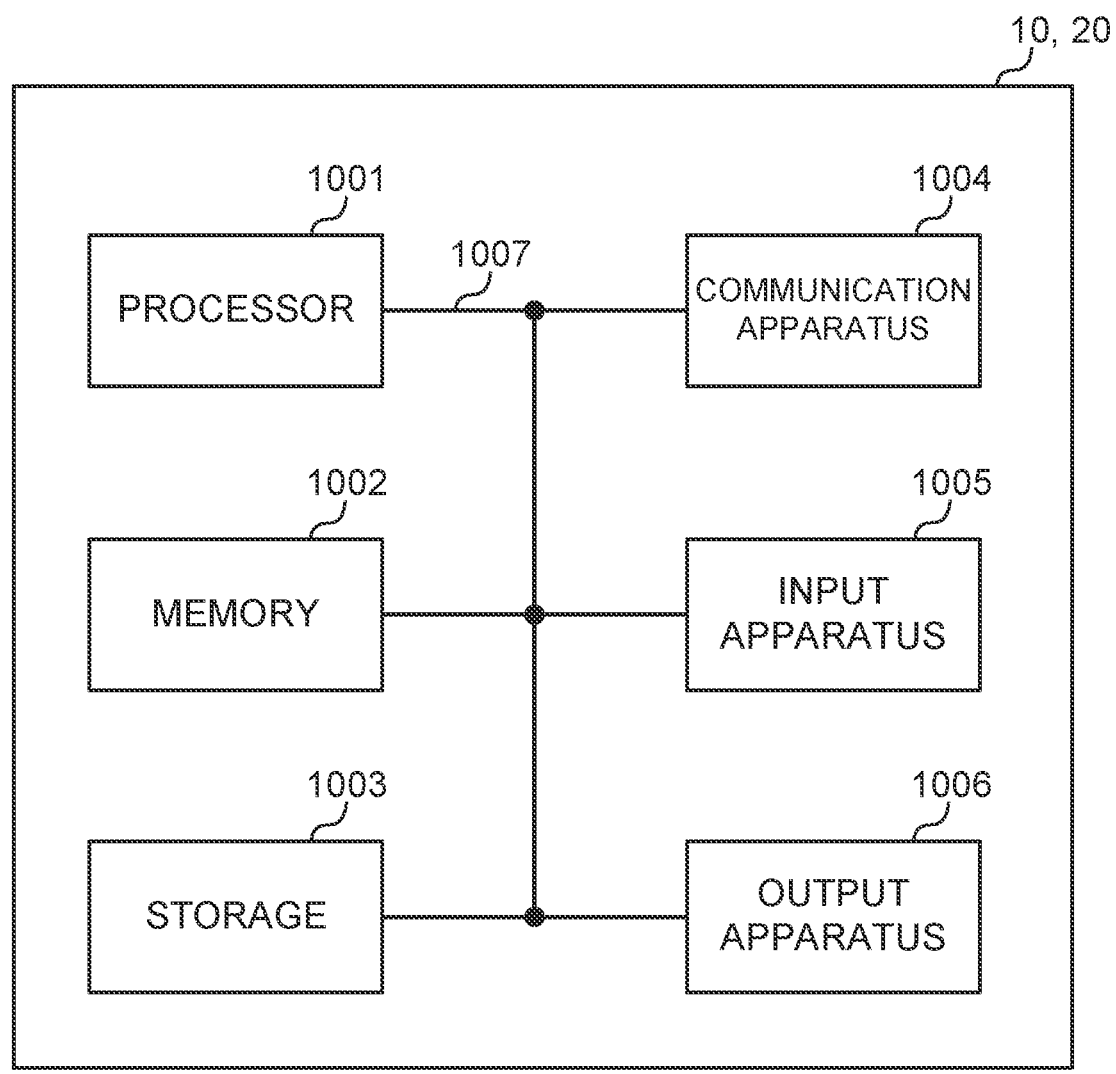
FIG. 19 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 19 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing given software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120a (220a) and the receiving section 120b (220b) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on).

Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a given signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit more than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for given numerology in a given carrier. Here, a common RB may be specified by an index of the RB based on the common reference point of the carrier. A PRB may be defined by a given BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a given signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to given values, or may be represented in another corresponding information. For example, radio resources may be specified by given indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of given information (for example, reporting of "X holds") does not necessarily have to be reported explicitly, and can be reported implicitly (by, for example, not reporting this given information or reporting another piece of information).

Determinations may be made in values represented by one bit (0 or 1), may be made in Boolean values that represent true or false, or may be made by comparing numerical values (for example, comparison against a given value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a moving object or a moving object itself, and so on. The moving object may be a vehicle (for example, a car, an airplane, and the like), may be a moving object which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "sidelink"). For example, an uplink channel, a downlink channel and so on may be interpreted as a sidelink channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), 6th generation mobile communication system (6G), xth generation mobile communication system (xG) (xG (where x is, for example, an integer or a decimal)), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (U4B), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

"The maximum transmit power" according to the present disclosure may mean a maximum value of the transmit power, may mean the nominal maximum transmit power (the nominal UE maximum transmit power), or may mean the rated maximum transmit power (the rated UE maximum transmit power).

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

The invention claimed is:

1. A terminal comprising:
   a receiver that receives a higher layer signaling indicating a search space, and receives downlink control information (DCI) scheduling a physical downlink shared channel (PDSCH) in the search space; and
   a processor that determines, based on the search space and the DCI, whether the PDSCH is multicast or unicast,
   wherein an ID corresponding to the search space is configured, and
   the receiver uses a sequence corresponding to the ID for the DCI.

2. The terminal according to claim 1, wherein when time domain resource assignment (TDRA) information for unicast and TDRA information for multicast are configured, and the PDSCH is determined as multicast, the processor determines a time resource of the PDSCH based on the TDRA information for the multicast.

3. A radio communication method for a terminal, comprising:
   receiving higher layer signaling indicating a search space, and receiving downlink control information (DCI) scheduling a physical downlink shared channel (PDSCH) in the search space; and
   determining, based on the search space and the DCI, whether the PDSCH is multicast or unicast,
   wherein an ID corresponding to the search space is configured, and
   a sequence corresponding to the ID is used for the DCI.

4. A base station comprising:
   a transmitter that transmits a higher layer signaling indicating a search space for multicast and a higher layer signaling indicating a search space for unicast; and
   a processor that determines to transmit a physical downlink shared channel (PDSCH) for one of a multicast PDSCH or a unicast PDSCH,
   wherein the processor controls to transmit downlink control information (DCI) scheduling the PDSCH in the search space corresponding to the PDSCH,
   an ID corresponding to the search space is configured, and
   a sequence corresponding to the ID is used for the DCI.

5. A system comprising a terminal and a base station, wherein
   the terminal comprises:
      a receiver that receives higher layer signaling indicating a search space, and receives downlink control information (DCI) scheduling a physical downlink shared channel (PDSCH) in the search space; and
      a processor that determines, based on the search space and the DCI, whether the PDSCH is multicast or unicast,
      wherein an ID corresponding to the search space is configured, and
      the receiver uses a sequence corresponding to the ID for the DCI, and
   the base station comprises:
      a transmitter that transmits the higher layer signaling, and
      a processor that determines to transmit the PDSCH,
      wherein the processor of the base station controls to transmit the DCI.

* * * * *